(12) United States Patent
Jin et al.

(10) Patent No.: US 10,142,829 B2
(45) Date of Patent: Nov. 27, 2018

(54) METHOD FOR PROVIDING NETWORK SERVICE AND ELECTRONIC DEVICE

(71) Applicant: Samsung Electronics Co., Ltd., Gyeonggi-do (KR)

(72) Inventors: Choong Hee Jin, Seoul (KR); Sang Bae Shin, Gyeonggi-do (KR); Sun Min Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 70 days.

(21) Appl. No.: 14/855,749

(22) Filed: Sep. 16, 2015

(65) Prior Publication Data
US 2016/0080932 A1    Mar. 17, 2016

(30) Foreign Application Priority Data

Sep. 16, 2014  (KR) ........................ 10-2014-0122952

(51) Int. Cl.
*H04W 8/18* (2009.01)
*H04W 4/60* (2018.01)
*H04W 8/20* (2009.01)

(52) U.S. Cl.
CPC ............. *H04W 8/183* (2013.01); *H04W 4/60* (2018.02); *H04W 8/205* (2013.01)

(58) Field of Classification Search
CPC ..... H04W 8/205; H04W 12/06; H04W 8/183; H04W 8/20; H04W 88/02; H04W 8/265;
(Continued)

(56) References Cited

U.S. PATENT DOCUMENTS 8,023,941 B2   9/2011  Shaheen et al.
8,171,529 B2   5/2012  Dadu et al.
(Continued)

FOREIGN PATENT DOCUMENTS

EP   2 670 171   12/2013
EP   2 680 628    1/2014
(Continued)

OTHER PUBLICATIONS

ETSI, Smart Cards; Embedded UICC; Requirements Specification (Release 12), Technical Specification, ETSI TS 103 383 V12.5.0, Aug. 2014, 26 pages.
International Search Report dated Mar. 18, 2016 issued in counterpart application No. PCT/KR2015/009755, 10 pages.
European Search Report dated Aug. 4, 2017 issued in counterpart application No. 15842001.8-1854, 9 pages.
(Continued)

*Primary Examiner* — Kwasi Karikari
(74) *Attorney, Agent, or Firm* — The Farrell Law Firm, P.C.

(57) ABSTRACT

An electronic device and method of providing network service are provided. The electronic device includes at least one processor configured to select a subscriber profile to be used by an external electronic device functionally connected to the electronic device from among a plurality of subscriber profiles available in the electronic device, and a communication interface configured to provide, to the external electronic device, a network service based on the subscriber profile selected. The method includes receiving a network connection request from an external electronic device functionally connected to an electronic device; selecting a subscriber profile to be used by the external electronic device from among a plurality of subscriber profiles available in the electronic device in response to the network connection request received by the electronic device; and providing, by the electronic device, a network service based on the selected subscriber profile to be used by the external electronic device.

20 Claims, 13 Drawing Sheets

(58) Field of Classification Search
CPC ....... H04W 48/18; H04W 4/24; H04W 36/14; H04W 60/005; H04W 8/06; H04W 60/00; H04L 67/306; H04L 9/3268; H04M 15/7556

See application file for complete search history.

(56) References Cited

U.S. PATENT DOCUMENTS

| | | | |
|---|---|---|---|
| 8,356,340 B2 | 1/2013 | Dadu et al. | |
| 8,626,165 B1* | 1/2014 | Narasimhan | H04W 36/14 370/252 |
| 8,868,679 B2 | 10/2014 | Bell et al. | |
| 9,020,465 B2 | 4/2015 | Nousiainen et al. | |
| 9,137,656 B2 | 9/2015 | O'Leary | |
| 9,414,220 B2 | 8/2016 | Lee et al. | |
| 9,467,187 B2 | 10/2016 | Lee et al. | |
| 9,503,886 B2 | 11/2016 | Bell et al. | |
| 9,705,407 B2 | 7/2017 | Gekinozu et al. | |
| 2005/0136898 A1 | 6/2005 | Shaheen et al. | |
| 2010/0311402 A1 | 12/2010 | Srinivasan et al. | |
| 2011/0151836 A1 | 6/2011 | Dadu et al. | |
| 2011/0289186 A1 | 11/2011 | Bell et al. | |
| 2012/0115442 A1 | 5/2012 | Dadu et al. | |
| 2013/0142112 A1 | 6/2013 | Yang et al. | |
| 2013/0232218 A2 | 9/2013 | Bell et al. | |
| 2013/0283047 A1 | 10/2013 | Merrien et al. | |
| 2013/0316672 A1* | 11/2013 | Nousiainen | H04W 4/001 455/406 |
| 2013/0344864 A1* | 12/2013 | Park | H04W 8/18 455/432.3 |
| 2014/0004827 A1 | 1/2014 | O'Leary | |
| 2014/0073292 A1* | 3/2014 | Kim | H04W 12/06 455/411 |
| 2014/0308991 A1* | 10/2014 | Lee | H04W 8/183 455/558 |
| 2015/0003258 A1 | 1/2015 | Bell et al. | |
| 2015/0281198 A1 | 10/2015 | Lee et al. | |
| 2015/0281964 A1 | 10/2015 | Seo et al. | |
| 2015/0349825 A1 | 12/2015 | Lee et al. | |

FOREIGN PATENT DOCUMENTS

| | | |
|---|---|---|
| KR | 10-2006-0116801 | 11/2006 |
| KR | 1020130049730 | 5/2013 |
| KR | 1020140064601 | 5/2014 |
| WO | WO 2014/073836 | 5/2014 |
| WO | WO 2014/077544 | 5/2014 |
| WO | WO 2014/092385 | 6/2014 |

OTHER PUBLICATIONS

European Search Report dated Jun. 21, 2018 issued in counterpart application No. 15842001.8-1214, 5 pages.

* cited by examiner

METHOD FOR PROVIDING NETWORK SERVICE AND ELECTRONIC DEVICE

PRIORITY

This application claims priority under 35 U.S.C. § 119(a) to a Korean Patent Application filed on Sep. 16, 2014 in the Korean Intellectual Property Office and assigned Serial No. 10-2014-0122952, the entire disclosure of which is incorporated herein by reference.

BACKGROUND

1. Field of the Disclosure

The present disclosure relates to a method and electronic device for providing a network service, and more particularly, to a network service providing method and electronic device for providing a network service to another electronic device using a subscriber profile of the electronic device.

2. Description of the Related Art

Unlike a typical removable card such as a subscriber identity module (SIM) card, a universal SIM (USIM) card, or a universal integrated circuit card (UICC), an embedded UICC (eUICC) or an embedded SIM (eSIM) card is installed as a type of a integrated circuit (IC) in an electronic device at the time of manufacturing the electronic device, and is thus not removable by a user. The eUICC or eSIM card enables a change of an operator without requiring the removal of the eUICC or eSIM card by virtue of an over-the-air (OTA) technology, and is thus able to continue to be used.

SUMMARY

Accordingly, an aspect of the present disclosure is to provide a network service providing method and electronic device for providing a network service to another electronic device using a subscriber profile of the electronic device.

Another aspect of the present disclosure is to provide a non-transitory computer-readable recording medium for recording a program for performing a network service providing method.

In accordance with an aspect of the present disclosure, an electronic device is provided. The electronic device includes at least one processor configured to select a subscriber profile to be used by an external electronic device functionally connected to the electronic device from among a plurality of subscriber profiles available in the electronic device, and a communication interface configured to provide, to the external electronic device, a network service based on the subscriber profile selected.

In accordance with another aspect of the present disclosure, a method of providing a network service is provided. The method includes receiving a network connection request from an external electronic device functionally connected to the electronic device; selecting a subscriber profile to be used by the external electronic device from among a plurality of subscriber profiles available in the electronic device in response to the network connection request of the electronic device; and providing, by the electronic device, a network service based on the selected subscriber profile to the external electronic device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
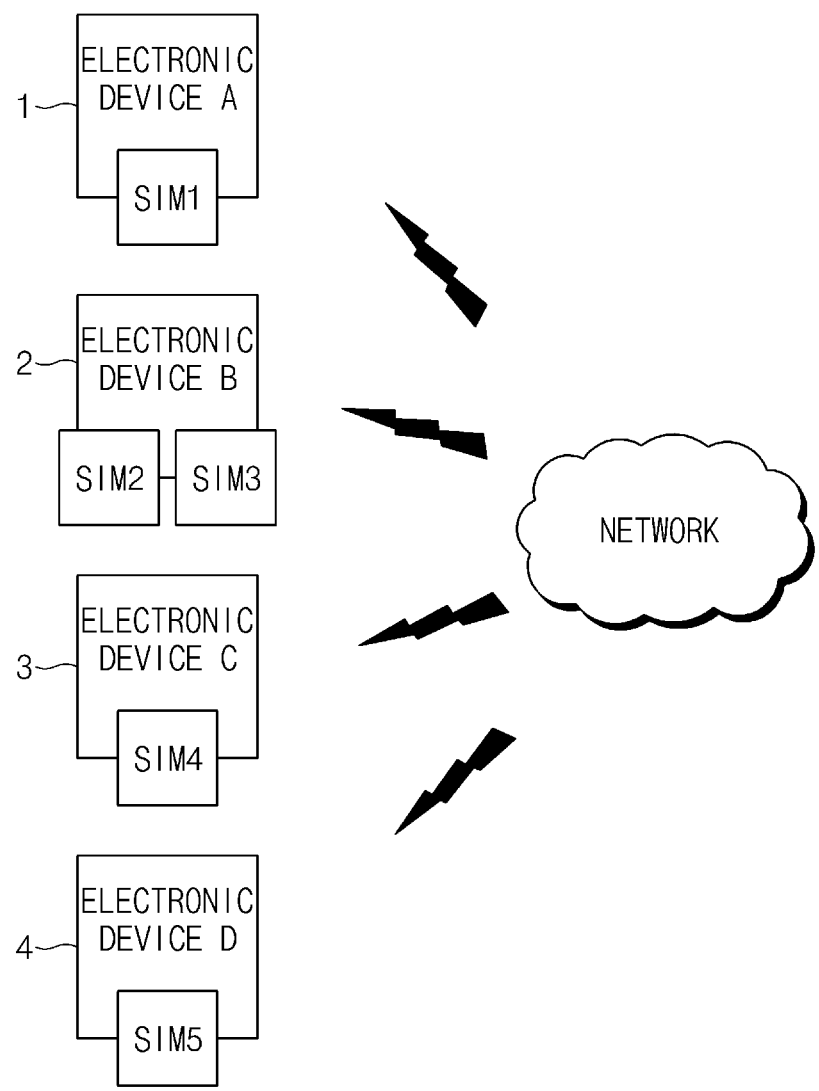
FIG. 1 is a block diagram of an electronic device performing a network connection using a SIM card inserted therein.

Hereinafter, various embodiments of the present disclosure are described with reference to the accompanying drawings. The present disclosure may be variously modified and may include various embodiments. However, certain embodiments are illustrated in the accompanying drawings and detailed descriptions related thereto are provided below. However, it should be understood that the present disclosure is not limited to the embodiments of the present disclosure but rather include all modifications, equivalents and/or alternatives that fall within the scope and spirit of the present disclosure. Regarding the accompanying drawings, like reference numerals refer to like elements.

The terms "include," "comprise," "including," or "comprising" used herein indicate disclosed functions, operations, or existence of elements, but do not exclude other functions, operations or elements. It should be further understood that the terms "include," "including" "comprise," "comprising," "have," or "having" used herein indicate the presence of stated features, numbers, operations, elements, components, or combinations thereof, but do not preclude the presence or addition of one or more other features, numbers, operations, elements, components, or combinations thereof.

The terms "or" and "at least one of A and/or B" used herein include any and all combinations of words listed together with the terms. For example, the phrases "A or B" and "at least one of A and/or B" may indicate A, B, or both A and B.

The terms such as "first," "second," and the like used herein may refer to various elements of various embodiments of the present disclosure, but do not limit the elements. For example, such terms do not limit the order and/or priority of the elements. Furthermore, such terms may be used to distinguish one element from another element. For example, a first user device and a second user device indicate different user devices. For example, without departing from the scope of the present disclosure, a first element may be referred to as a second element, and similarly, a second element may be referred to as a first element.

It should be understood that when an element is referred to as being "connected" or "coupled" to another element, it can be directly connected or coupled to the other element or intervening elements may be present between the element and the other element. In contrast, it should be understood that when an element is referred to as being "directly connected" or "directly coupled" to another element, there are no intervening elements between the element and the other element.

The terms used herein are not for delimiting the present disclosure but for describing certain embodiments of the present disclosure. The terms of a singular form may include plural forms unless otherwise specified.

The terms used herein, including technical or scientific terms, have the same meanings as understood by those skilled in the art unless otherwise defined herein. Commonly-used terms defined in a dictionary should be interpreted as having meanings that are the same as contextual meanings defined in the related art, and should not be interpreted in an idealized or overly formal sense unless otherwise defined explicitly.

Hereinafter, an electronic device according to an embodiment of the present disclosure is described below with reference to the accompanying drawings.

FIG. 1 is a block diagram of an electronic device performing network connection using a SIM card inserted therein.

Referring to FIG. 1, each of an electronic device A 1, an electronic device B 3, an electronic device C 5, and an electronic device D 7 illustrated in FIG. 1 may include at least one SIM and may be connected to a network 9 using the SIM. The SIM may provide a subscriber authentication function, a billing function, a security function, or the like in an electronic device that performs mobile communication. The SIM may contain telecommunications operator information, roaming information, authentication information, subscriber information, or the like. A SIM card, a USIM card, or a UICC may provide a subscriber authentication function, a billing function, a security function, or the like in an electronic device that performs mobile communication.

An integrated circuit card identification (ICCID) assigned by an operator and authentication information (e.g., an international mobile subscriber identity (IMSI), a network authentication key (K), or the like) for accessing a certain mobile network operator (MNO) are recorded in a SIM card, a USIM card, or a UICC, which is a removable card insertable into or removable from an electronic device, at the time of manufacturing the cards before the cards are commercially available. Therefore, an operator cannot be changed without changing a SIM card.

For an electronic device using a SIM card, a USIM card, a UICC, or the like, a user of the electronic device must purchase a card for each operator desired to be used. For example, if a user of the electronic device A 1, which currently uses an operator A with a SIM 1, desires to change an operator from the operator A to an operator B, the user should purchase a card including a new SIM. Furthermore, if the user desires to use two SIMs in the electronic device provided with one card slot, the user must remove a card including a currently used SIM and then should insert a card including a new SIM.

If the user desires to access two or more operators simultaneously, the user must insert two cards into an electronic device having two card slots, such as the electronic device B 3. Such card slots deteriorate an electronic device in terms of miniaturization and durability.

Moreover, in order for a plurality of electronic devices to connect to a network 9 using SIMs, each electronic device must be provided with a cellular modem and an antenna for a connection to the network 9.

Figure 2:
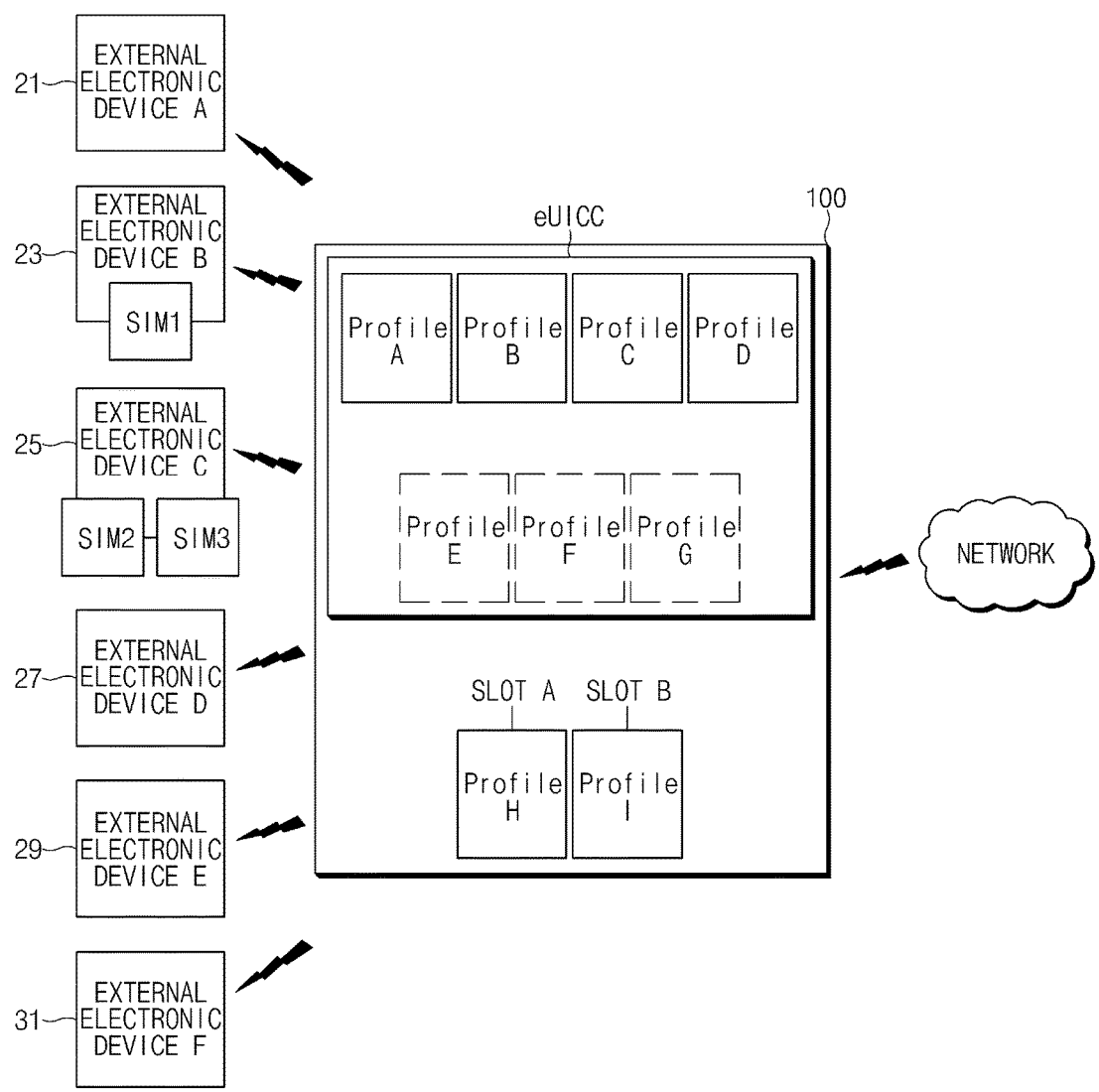
FIG. 2 is a block diagram of a network connection performed using an eUICC of an electronic device to which an external electronic device is connected according to an embodiment of the present disclosure.

FIG. 2 is a block diagram of a network connection performed using an eUICC of an electronic device to which an external electronic device is connected according to an embodiment of the present disclosure.

An eUICC or eSIM (hereinafter "eUICC") is sold without operator information stored therein. Thereafter, an electronic device equipped with an eUICC may access a network of an operator that the user desires to use so as to download a subscriber profile over the air (OTA), and may configure the eUICC so that the eUICC supports a network service provided by the operator. The subscriber profile which is a module corresponding to the above-described SIM may include telecommunications operator information, roaming information, authentication information (IMSI or the like), subscriber information (ICCID or the like), or the like. The user may access a network of a certain telecommunications operator and may use a network service provided by the operator, using the subscriber profile. One subscriber profile corresponds to one SIM, and a plurality of subscriber profiles must be downloaded in order to use network services provided by multiple operators. The subscriber profile may include an MNO profile, an operator profile, a UICC profile, or the like.

Referring to FIG. 2, an electronic device 100 includes an eUICC which includes four subscriber profiles, i.e., a profile A, a profile B, a profile C, and a profile D. According to an embodiment of the present disclosure, in the case where the electronic device 100 includes two card slots, the electronic device 100 may use a profile H and a profile I included in SIMs respectively inserted into a slot A and a slot B, in addition to the four subscriber profiles. The electronic device 100 may enable at least one of the plurality of subscriber profiles included in the electronic device 100, and may use a network service supported by an enabled subscriber profile.

Referring to FIG. 2, a plurality of external electronic devices (e.g., external electronic devices A to F 21, 23, 25, 27, 29, and 31) may be functionally connected to the electronic device 100. For example, an external electronic devices may be connected to the electronic device 100 using Bluetooth BT, wireless fidelity (Wi-Fi), Bluetooth low energy (BLE), ZigBee, or the like. According to an embodiment of the present disclosure, the electronic device 100 may provide a network service to at least one external electronic device connected functionally to the electronic device 100, using the subscriber profiles of the electronic device 100.

For example, the electronic device 100 of FIG. 1 may provide, to the external electronic device A 21, a network service according to a corresponding subscriber profile using the profiles A to D included in the eUICC of the electronic device 100 or at least one of the profiles H and I included in the SIMs respectively inserted into the slots A and B of the electronic device 100.

According to an embodiment of the present disclosure, the electronic device 100 may fetch a subscriber profile included in the external electronic device, and may provide a network service to the external electronic device connected to the electronic device 100 using the subscriber profile. For example, the electronic device 100 may fetch a profile E of a SIM 1 of the external electronic device B. The electronic device 100 may provide, to the external electronic device D 27, a network service corresponding to the profile E. Likewise, the electronic device 100 may fetch a profile F and a profile G respectively included in a SIM 2 and a SIM 3 of the external electronic device C 25, and may provide a network service to at least one of the external electronic devices A to F 21, 23, 25, 27, 29, 31 using the profile F or the profile G.

For example, if a subscriber profile for providing a network service desired by the external electronic device E 29 does not exist in the electronic device 100 but is included in the external electronic device B 23, the external electronic device B 23 may provide the profile B included in the external electronic device B 23 to the electronic device 100. The electronic device 100 may use the profile E received from the external electronic device B 23, or may provide, to another external electronic device (e.g., the external electronic device E 29), a network service using the subscriber profile.

Accordingly, the electronic device 100 may provide a network service to the external electronic devices A to F 21, 23, 25, 27, 29, and 31 using at least one of the plurality of subscriber profiles including the subscriber profiles A to D included in the eUICC of the electronic device 100, the subscriber profiles H and I included in the SIMs inserted into the electronic device 100, and the profiles E to G included in the external electronic devices connected to the electronic device 100.

The electronic device 100 may select at least one of the plurality of subscriber profiles A to I available in the electronic device 100 as a subscriber profile to be used by an external electronic device functionally connected to the electronic device 100, and may provide, to the external electronic device, a network service according to the selected subscriber profile.

The electronic device 100 may select a subscriber profile to be used by an external electronic device based on information related to the external electronic device. The information related to the external electronic device may correspond to at least one of device information of the external electronic device, information on an application to be executed in the external electronic device, and information on a service requested by the external electronic device.

For example, the external electronic device A may transmit device information thereof to the electronic device 100, while requesting a network service from the electronic device 100. For example, if the external electronic device A 21 is a home appliance such as a refrigerator for which a data transfer speed is not relatively important, the electronic device 100 may select, based on the device information of the external electronic device A 21, a subscriber profile that supports a 2G network service as a subscriber profile to be used by the external electronic device A 21. As another example, if the external electronic devices A 21, D 27, and E 29 are the same type of electronic device such as a smartphone, the electronic device 100 may select, based on the device information of the external electronic devices A 21, D 27, and E 29, the profile D for all the external electronic devices A 21, D 27, and E 29 so that the external electronic devices A 21, D 27, and E 29 of the same type may use the same subscriber profile.

For example, the external electronic device B 23 may transmit information on an application to be executed in the external electronic device B 23 to the electronic device 100, while requesting a network connection from the electronic device 100. For example, in the case where the external electronic device B 23 is to execute an application X for playing a video in real time through a network, the external electronic device B 23 may transmit application information related to the application X to the electronic device 100. The electronic device 100 may receive the application information from the external electronic device B 23, and may select a subscriber profile that supports long term evolution (LTE) providing a high data transfer speed as a subscriber profile to be used by the external electronic device B 23.

For example, the external electronic device C 25 may request the electronic device 100 to provide information on a service to be used by the external electronic device C 25, while requesting a network connection from the electronic device 100. For example, in the case where the external electronic device C 25 requires a packet data service, the external electronic device C 25 may transmit service information for requesting the packet data service to the electronic device 100. The electronic device 100 may receive the service information from the external electronic device C 25, and may select a subscriber profile that provides a packet data-dedicated SIM from among the plurality of subscriber profiles as a subscriber profile to be used by the external electronic device C 25.

For another example, the external electronic device D 27 may transmit information on an application to be executed and service information to the electronic device 100, and may request a network connection from the electronic device 100. For example, in the case where the external electronic device D 27 is to execute an application Y for playing a video with high definition (HD) resolution without a price limit, the external electronic device D 27 may transmit application information related to the application Y and service information (e.g., HD resolution, no price limit) to the electronic device 100. The electronic device 100 may select, based on the information received from the external electronic device D 27, a subscriber profile that supports LTE as a subscriber profile to be used by the external electronic device D 27.

If a voice call and a packet data service are required, the external electronic device D 27 may transmit service information for requesting both the voice call and the packet data service to the electronic device 100. The electronic device 100 may select, based on the service information received, a subscriber profile for enabling use of both the voice call and the packet data service, and may provide a network service to the external electronic device D 27 using the selected subscriber profile.

The electronic device 100 may perform load balancing according to situations among the plurality of external electronic devices.

For example, if a data transfer speed is decreased or a network service is suddenly unavailable in a state where the profiles D and E have the same network service attributes excepting an operator and the external electronic device E 29 uses the profile D, the electronic device 100 may automatically replace the profile D used by the external electronic device E 29 with the profile E having the same network service attributes excepting an operator.

For example, if the electronic device 100 selects the profile C as a subscriber profile to be used by the external electronic device D 27, in a state where the profile C for providing a service to up to three electronic devices simultaneously is used by the external electronic devices A 21, B 23, and E 29, the electronic device 100 may allow at least one of the external electronic devices A 21, B 23, and E 29 which use the profile C to use another subscriber profile.

As described above, the electronic device 100 according to an embodiment of the present disclosure may provide, to an external electronic device not having a SIM, a network service suitable for the external electronic device using a plurality of subscriber profiles available in the electronic device 100.

Figure 3:
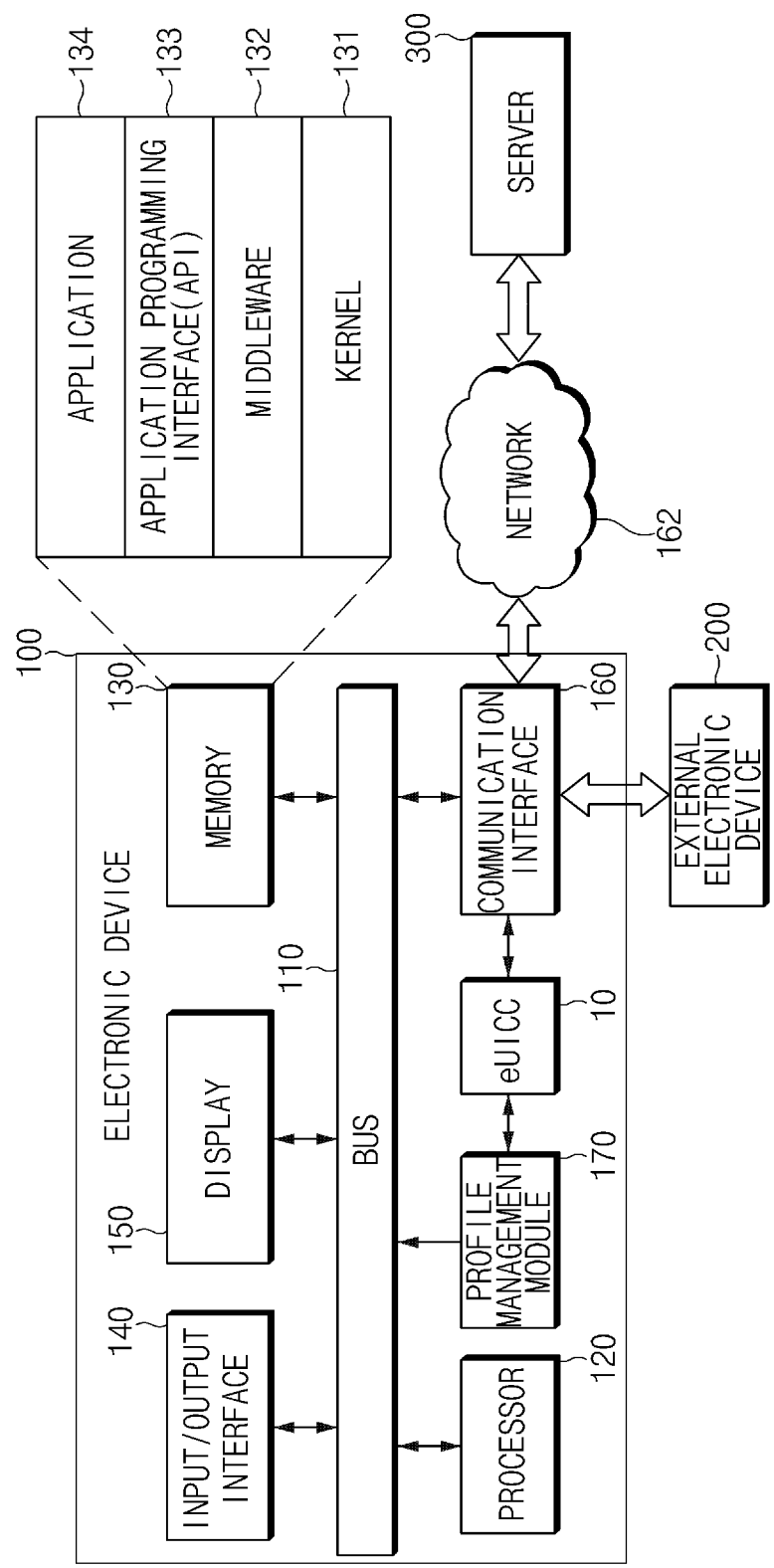
FIG. 3 is a block diagram of an electronic device according to an embodiment of the present disclosure.

FIG. 3 is a block diagram of an electronic device according to an embodiment of the present disclosure.

Referring to FIG. 3, the electronic device 100 may include an eUICC 10, a bus 110, a processor 120, a memory 130, an input/output interface 140, a display 150, a communication interface 160, and a profile management module 170.

The eUICC 10 may include a plurality of subscriber profiles. Each subscriber profile may include telecommunications operator information, roaming information, authentication information (IMSI or the like), subscriber information (ICCID or the like), or the like. A subscriber profile may be added to or deleted from the eUICC 10.

The bus 110 may be a circuit for connecting the above-described elements to each other and transferring communications (e.g., control messages) between the above-described elements.

The processor 120 may select a subscriber profile to be used by an external electronic device 200 functionally connected to the electronic device 100, from among a plurality of subscriber profiles available in the electronic device 100. The processor 120 may calculate a network service usage fee for each external electronic device to which the electronic device 100 provides a network service.

The processor 120 may select a subscriber profile to be used by the external electronic device 200 from among the plurality of subscriber profiles based on information related to the external electronic device 200. For example, the information related to the external electronic device 200 may be at least one of device information of the external electronic device 200, information on an application to be executed in the external electronic device 200, and information on a service requested by the external electronic device 200.

The device information may be a serial number (e.g., a manufacture number or a unique number), a manufacturer, a device type, a device attribute, a device specification (e.g., whether or not a display exists), or the like.

The application information may be application identification information, an application attribute, an application specification, hardware (H/W) or software (S/W) elements used by an application, or the like. For example, the processor 120 may select a subscriber profile from among the plurality of subscriber profiles based on a specification of an application to be executed in the external electronic device 200. For example, if the processor 120 determines, based the application specification received from the external electronic device 200, that a data transfer speed of the application to be executed in the external electronic device 200 should be high, the processor 120 may select a subscriber profile that supports 4G from among subscriber profiles that support 2G, 3G, and 4G, respectively.

The service information requested may include a circuit switch (CS) network service, a packet data service, a desired data rate, whether or not roaming is supported, or the like. For example, the external electronic device 200 may determine required service information based on the device information, the information on an application to be executed, or the like of the external electronic device 200, and may request the service information from the electronic device 100.

The processor 120 may select a subscriber profile to be used by the external electronic device 200 using a subscriber profile table. The subscriber profile table defines a network service attribute provided by each subscriber profile.

The processor 120 may select a subscriber profile to be used by the external electronic device 200 according to a policy rule. The policy rule determines a priority between network service attributes. For example, the processor 120 may select subscriber profiles so that external electronic devices of the same type may use the same subscriber profile according to the policy rule.

The processor 120 may select a subscriber profile to be used by the external electronic device 200 based on a subscriber profile use history. The processor 120 may determine, based on the subscriber profile use history, whether the external electronic device 200 has requested a network connection before, and, if so, the processor 120 may determine whether the external electronic device 200 requests the same service as before, and may select the subscriber profile.

The processor 120 may select a subscriber profile to be used by the external electronic device 200 based on subscriber profile information selected by the external electronic device 200 based on a subscriber profile list.

The processor 120 may select a subscriber profile to be used by the external electronic device 200 or may change a subscriber profile being used by the external electronic device 200 based on a command received from a controller that remotely controls use of a subscriber profile of the external electronic device 200. The processor 120 may make an addition or an amendment to the policy rule that determines the priority between network service attributes, based on the command received from the controller.

The processor 120 may perform load balancing according to situations among a plurality of external electronic devices 200. If a data transfer speed of a network service according to the subscriber profile decreases to a pre-determined value or less, the processor 120 may change the subscriber profile of at least one external electronic device that uses the subscriber profile. For example, if a data transfer speed of the profile A used by the external electronic device 200 suddenly decreases, the electronic device 100 may change the subscriber profile used by the external electronic devices A 21 and B 23 from the profile A to another subscriber profile so that a plurality of external electronic devices are distributively connected.

If the network service according to the subscriber profile is not available, the processor 120 may change the subscriber profile of the external electronic device 200 that uses the subscriber profile. For example, if the use of the profile B by the external electronic device 200 is suspended, the subscriber profile of the external electronic device 200 that uses the profile B may be changed from the profile B to another subscriber profile.

If the number of external electronic devices that have selected a subscriber profile exceeds the number of electronic devices allowed to use the subscriber profile, the processor 120 may change the subscriber profile of at least one external electronic device that uses the subscriber profile.

For example, if the external electronic device C 25 desires to use the profile C in a state where a maximum number of external electronic devices connectable to the profile C used by the external electronic device 200 is two, but the external electronic devices A 21 and B 23 currently use the profile C, the electronic device 100 may change the subscriber profile of the external electronic device B 23 among the external electronic devices A to C 21, 23, 25 that desire to use the profile C from the profile C to another subscriber profile so that the external electronic devices A 21 and C 25 may use the profile C. In this case, the electronic device 100 may select a most suitable external electronic device for using the profile C from among the external electronic devices A to C 21, 23, 25, using a policy rule for context switching.

The policy rule for context switching (or a policy rule for load balancing) is different from a policy rule for selecting a subscriber profile to be used by the external electronic device 200 from among a plurality of subscriber profiles. The policy rule for context switching represents a policy rule for selecting the external electronic device 200 that is to use a subscriber profile from among the plurality of external electronic devices 200 that desire to use the subscriber profile.

The processor 120 may replace the subscriber profile used by an external electronic device with another subscriber profile according to a user input to the electronic device 100.

Regarding a plurality of external electronic devices, the user input may apply the same subscriber profile or individual subscriber profiles to external electronic devices having the same information according to the device information of the plurality of external electronic devices, the information on applications executed in the plurality of external electronic devices, or the information on services requested by the plurality of external electronic devices. For example, if the external electronic device A 21 is a closed-circuit television (CCTV), a subscriber profile of each CCTV that is the same device as the external electronic device A 21 may be changed by the user input so that all such CCTVs use the same subscriber profile. Alternatively, a subscriber profile of each CCTV that is the same device as the external electronic device A 21 may be changed so that all such CCTVs use individual subscriber profiles.

If the processor 120 determines that there is no subscriber profile providable to the external electronic device 200, the external electronic device 200 may retrieve a subscriber profile providable to the external electronic device 200, and may download and install a retrieved subscriber profile in the electronic device 100.

The processor 120 may receive a command from another element (e.g., the memory 130, the input/output interface 140, the display 150, the communication interface 160, or the profile management module 170) through the bus 110, may interpret the received command, and may perform an operation or process data according to the interpreted command.

The processor 120 may include at least one processor.

The memory 130 may store a subscriber profile table in which a network service attribute provided by each subscriber profile is defined. The memory 130 may update the subscriber profile table according to a change in a network service attribute of a subscriber profile.

The memory 130 may store a policy rule for determining the priority between network service attributes. According to an embodiment of the present disclosure, the memory 130 may store a plurality of policy rules according to the types of external electronic devices or the types of applications. For example, the same policy rule may be applied to external electronic devices of the same type. Accordingly, external electronic devices of the same type may use the same subscriber profile. Alternatively, the same policy rule may be applied to applications of the same type. Accordingly, applications of the same type may use the same subscriber profile.

The memory 130 may update the policy rule based on information received from a server or a user input to the electronic device 100. The memory 130 may store the policy rule for load balancing or context switching for selecting the external electronic device 200 that is to use a subscriber profile from among the plurality of external electronic devices that desire to use the subscriber profile.

The memory 130 may store the subscriber profile use history. For example, the memory 130 may store the subscriber profile use history for each external electronic device, for each application, or for each piece of information on a service requested by an external electronic device. The memory 130 may update the subscriber profile use history based on a network service provided to the external electronic device 200 by the electronic device 100. For example, when a network connection request is received from the external electronic device 200, or when the subscriber profile of the external electronic device 200 is changed, the memory 130 may update the subscriber profile use history.

The memory 130 may store a command or data received from or generated by the processor 120 or another element (e.g., the input/output interface 140, the display 150, the communication interface 160, or the profile management module 170). The memory 130 may include programming modules such as a kernel 131, a middleware 132, an application programming interface (API) 133, or an application 134. Each programming module may include software, firmware, hardware, or a combination thereof.

The kernel 131 may control or manage system resources (e.g., the bus 110, the processor 120, or the memory 130) used to perform an operation or function of another programming module, for example, the middleware 132, the API 133, or the application 134. Furthermore, the kernel 131 may provide an interface for the middleware 132, the API 133, or the application 134 to access individual elements of the electronic device 100 in order to control or manage the system resources.

The middleware 132 may serve as an intermediary between the API 133 or the application 134 and the kernel 131 so that the API 133 or the application 134 communicates and exchanges data with the kernel 131. Furthermore, the middleware 132 may perform a control operation (e.g., scheduling or load balancing) with respect to operation requests received from the application 134 by using, e.g., a method of assigning a priority for using system resources (e.g., the bus 110, the processor 120, or the memory 130) of the electronic device 100 to at least one application 134.

The API 133, which is an interface for allowing the application 134 to control a function provided by the kernel 131 or the middleware 132, may include at least one interface or function (e.g., a command) for, for example, file control, window control, image processing, or character control.

According to an embodiment of the present disclosure, the application 134 may include an short message service/multimedia messaging service (SMS/MMS) application, an electronic mail application, a calendar application, an alarm application, a health care application (e.g., an application for measuring an amount of exercise or blood sugar level), or an environmental information application (e.g., an application for providing barometric pressure, humidity or temperature information). Additionally or alternatively, the application 134 may be an application related to information exchange between the electronic device 100 and an external electronic device 200. An application related to information exchange may include, for example, a notification relay application for transferring certain information to an external electronic device or a device management application for managing an external electronic device.

For example, the notification relay application may include a function of transferring notification information generated by another application (e.g., an SMS/MMS application, an electronic mail application, a health care application, an environmental information application, or the like) of the electronic device 100 to an external electronic device 200. Additionally or alternatively, the notification relay application may receive notification information from an external electronic device 200 and may provide the notification information to the user. The device management application may manage (e.g., install, uninstall or update) a function (e.g., turning on/off an external electronic device (or a component thereof) or adjusting brightness (or resolution) of a display) of at least a part of the external electronic device 200 communicating with the electronic device 100, an application operated in the external electronic device, or a service (e.g., a call service or a messaging service) provided from the external electronic device 200.

According to an embodiment of the present disclosure, the application 134 may include a certain application according to an attribute (e.g., the type of an electronic device) of the external electronic device 200. For example, if the external electronic device 200 is moving picture experts group audio layer 3 (MP3) player, the application 134 may include an application related to the playback of music. Similarly, if the external electronic device 200 is a mobile medical device, the application 134 may include an application related to health care. According to an embodiment of the present disclosure, the application 134 may included at least one of a certain application for the electronic device 100 or an application received from the external electronic device (e.g., a server 300 or the external electronic device 200).

The input/output interface 140 may receive a user input for selecting a subscriber profile of the external electronic device 200, or may receive a user input for changing a subscriber profile used by the external electronic device 200 into another subscriber profile. The input/output interface 140 may receive a user input for adding/changing/deleting a policy rule for selecting a subscriber profile according to a priority.

The input/output interface 140 may transfer a command or data input by the user through an input/output device (e.g., a sensor, a keyboard, or a touch screen) to the processor 120, the memory 130, or the communication interface 160, through, for example, the bus 110. For example, the input/output interface 140 may provide, to the processor 120, data on a touch of a user input through a touch screen. Furthermore, the input/output interface 140 may output, through the input/output device (e.g., a speaker or a display), for example, the command or data received from the processor 120, the memory 130, or the communication interface 160 through the bus 110. For example, the input/output interface 140 may output voice data processed by the processor 120 to the user through a speaker.

The display 150 may show various pieces of information (e.g., multimedia data or text data) to the user.

The communication interface 160 may provide, to the external electronic device 200, a network service according to a subscriber profile selected by the processor 120. The communication interface 160 may provide a network service to the electronic device 100 and a plurality of external electronic devices connected thereto using a plurality of subscriber profiles available for the electronic device 100.

The communication interface 160 may access a network of a certain telecommunications operator using the subscriber profiles included in the eUICC 10. The communication interface 160 may connect the external electronic device 200 to the network using the subscriber profiles included in the eUICC 10. Furthermore, the communication interface 160 may download and install a new subscriber profile in the eUICC 10 over the air. If a subscriber profile to be used is disabled, the communication interface 160 may enable the subscriber profile.

The communication interface 160 may receive a network connection request received from the external electronic device 200. In response to the network connection request, the communication interface 160 may notify the external electronic device 200 of a network connection in response to the network connection request.

The communication interface 160 may receive information related to the external electronic device 200 which has been transmitted from the external electronic device 200 or the server 300. The information related to the external electronic device 200 may include at least one of device information of the external electronic device 200, application information of an application to be executed in the external electronic device 200, and information on a service requested by the external electronic device 200.

The communication interface 160 may transmit a list of available subscriber profiles to the external electronic device 200, and may receive subscriber profile information from the external electronic device 200.

The communication interface 160 may receive a command from a server or a controller that remotely controls use of a subscriber profile of the external electronic device 200.

The communication interface 160 may establish a communication connection between the electronic device 100 and an external device (e.g., the external electronic device 200 or the server 300). The communication interface 160 may receive an application from the external device (e.g., the external electronic device 200 or the server 300). Accordingly, the external electronic device 200 may be functionally connected to the electronic device 100. The communication interface 160 may perform a device search, registration, authentication, or the like required for establishing a communication connection between the electronic device 100 and the external electronic device 200.

For example, the communication interface 160 may communicate with the external electronic device 200 or the server 300 through wireless communications or wired communications. The wireless communications may include at least one of Wi-Fi, BT, BLE, near field communication (NFC), global positioning system (GPS), or cellular communications (e.g., LTE, LTE advanced (LTE-A), code division multiple access (CDMA), wideband CDMA (WCDMA), universal mobile telecommunications system (UMTS), wireless broadband (WiBro), or global system for mobile communications (GSM)). The wired communications may include at least one of a universal serial bus (USB), a high definition multimedia interface (HDMI), a recommended standard 232 (RS-232), or a plain old telephone service (POTS).

According to an embodiment of the present disclosure, the network 162 may be a telecommunications network. The telecommunications network may include at least one of a computer network, the Internet, the Internet of Things (IoT), or a telephone network. According to an embodiment of the present disclosure, a protocol (e.g., a transport layer protocol, a data link layer protocol, or a physical layer protocol) for communication between the electronic device 100 and an external device may be supported by at least one of the application 134, the application programming interface 133, the middleware 132, the kernel 131, or the communication interface 160.

The profile management module 170 may manage a network service provided to the external electronic device 200 connected to the electronic device 100, using a subscriber profile.

The profile management module 170 may manage a subscriber profile table and a policy rule stored in the memory 130. Table 1 shown below is an example of a subscriber profile table.

TABLE 1

| ID | Profile Name | Capability | Roaming | Speed | Limited (Current) | Cost | History |
|---|---|---|---|---|---|---|---|
| 1 | VZW | Voice Call Packet Data | o | 2 G | 6(3) | Mid | List of Clients |
| 2 | TMO | Voice Call Video Call | o | 3 G | 4(2) | Low | List of Clients |
| 3 | AT&T | Packet Data | x | 3 G | 3(1) | Low | List of Clients |
| 4 | VZW | Voice Call (VoLTE) Video Call Packet Data | o | 4 G | 2(2) | High | List of Clients |

As shown in Table 1 above, the subscriber profile table may define a network service attribute provided by each subscriber profile. Each subscriber profile may be identified by an identification number (ID) of each subscriber profile. The mobile network operator (MNO) in the profile name column of Table 1 above represents a network operator that provides a network service connected by a subscriber profile. For example, regarding the subscriber profile ID 1 and the subscriber profile ID 4 in Table 1 above, a network service is provided by operator Verizon Wireless (VZW).

The capability item in Table 1 above represents a network service able to be provided by a corresponding subscriber profile. For example, the service information may indicate whether a network service connected by a corresponding subscriber profile supports a voice call, a video call, or a packet data service.

The roaming item in Table 1 above indicates whether a corresponding subscribe profile supports a roaming service, and the speed item represents a data transfer speed. The speed item may include an uplink/downlink data rate of a corresponding subscriber profile. The limited (current) item represents a maximum number of external electronic devices allowed to use the subscriber profile simultaneously followed by the number of external electronic devices, in parentheses, that currently use a corresponding subscriber profile. The cost item represents a cost (e.g., a cost per second or a cost range of high/mid/low) of using a network service of a corresponding subscriber profile.

The history item represents use history information of a subscriber profile. The history item may include a list of external electronic devices (e.g. list of clients) that have used a corresponding subscriber profile in the past.

According to an embodiment of the present disclosure, the processor 120 may select a subscriber profile to be used by the external electronic device 200 based on Table 1 above and a policy rule. For example, in the case where the external electronic device A 21 makes a network connection request, the processor 120 may refer to the history item of Table 1 above so as to check whether the external electronic device A 21 has used the profiles 1 to 4 before. If the external electronic device A 21 has not used the profiles 1 to 4 before, the processor 120 may select a subscriber profile to be used by the external electronic device A 21 according to the policy rule below. The processor 120 may select a subscriber profile from among subscriber profiles that satisfy service information requested by the external electronic device according to the priority of the policy rule.

For example, the processor 120 may use the following policy rule: Capability>Roaming>Speed>Cost.

The policy rule represents an order of network service attributes that a subscriber profile should preferentially satisfy among the network service attributes of the capability, roaming, speed, and cost. According to the policy rule, the capability should be most preferentially satisfied. For example, in the case where the external electronic device A 21 requests a packet data service, the profiles 1 and 4 that enable roaming may be selected from the profiles 1, 3, and 4 that provide a packet data service according to the policy rule. Since the speed should be considered next according to the policy rule, the profile 4 that provides 4G may be selected from among the profiles 1 and 4. In response to the network connection request of the external electronic device 200, the electronic device 100 may transmit information on a connected network (e.g., the 4G service of the operator Verizon) to the external electronic device 200.

However, the profile 4, which is able to provide a network service to up to two external electronic devices, is already providing a network service to the external electronic devices B 23 and C 25. Therefore, the electronic device 100 may provide a network service to the external electronic device A 21 using the profile 1, or may make at least one of the external electronic device B 23 or C 25 use another subscriber profile. In the case where a certain subscriber profile is not able to support all of a plurality of electronic devices that desire to use the same subscriber profile, an external electronic device that is to use the subscriber profile may be selected from among the plurality of external electronic devices according to the context switching policy rule.

The profile management module 170 may add the subscriber profile use history to Table 1 above to manage the subscriber profile use history as shown in Table 1 above, or may establish the subscriber profile use history according to a device type or an application type separately from the subscriber profile table to manage the subscriber profile use history.

Figure 4:
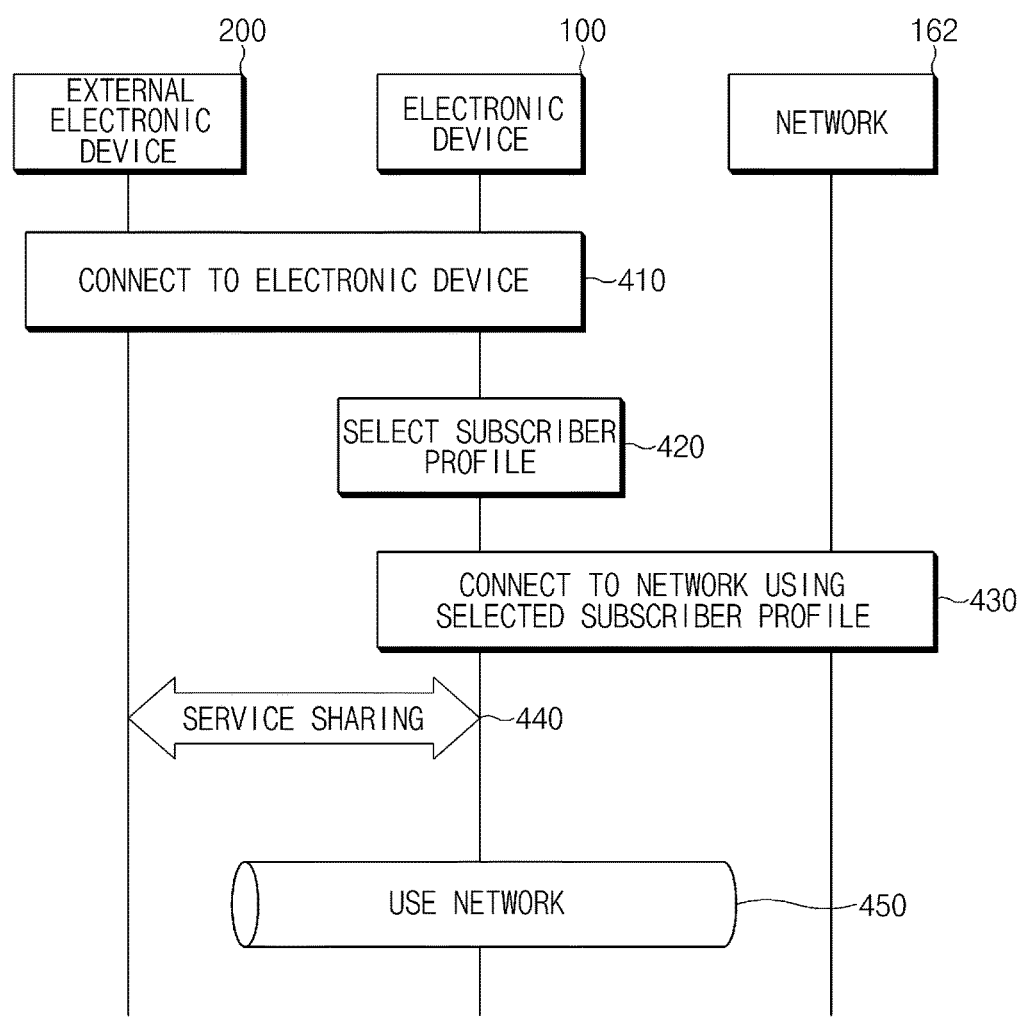
FIG. 4 is a flow diagram of a method of providing a network service by an electronic device according to an embodiment of the present disclosure.

FIG. 4 is a flow diagram of a method of providing a network service by an electronic device according to an embodiment of the present disclosure.

Referring to FIG. 4, in operation 410, the external electronic device 200 may be functionally connected to the electronic device 100. For example, the external electronic device 200 may be functionally connected to the electronic device 100 not using a cellular network but using Bluetooth, Wi-Fi, ZigBee, BLE, or the like.

In operation 420, the electronic device 100 may select a subscriber profile to be used by the external electronic device 200 from among a plurality of subscriber profiles available for the electronic device 100.

In operation 430, if a subscriber profile is selected, the electronic device 100 may be connected to the network 162 according to the selected subscriber profile. The electronic device 100 may determine whether the network 162 is connected, and, if the network 162 is not connected, the electronic device 100 may attempt to connect to the network 162.

If the subscriber profile selected by the external electronic device 200 is disabled, the electronic device 100 may enable the subscriber profile, and may be connected to the network 162 using the subscriber profile. In this case, the plurality of subscriber profiles may be enabled simultaneously.

In operation 440, the electronic device 100 may share a network service with the external electronic device 200.

In operation 450, the external electronic device 200 may use the network service provided by the electronic device 100. The external electronic device 200 may use the network 162 using the subscriber profile included in the electronic device 100.

Figure 5:
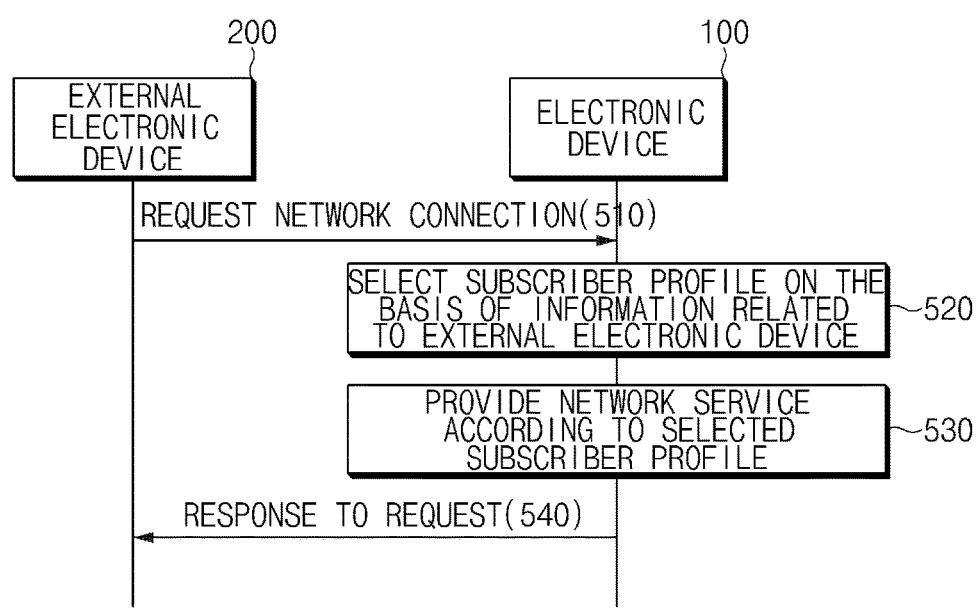
FIG. 5 is a flow diagram of a method of providing a network service by an electronic device according to an embodiment of the present disclosure.

FIG. 5 is a flow diagram of a method of providing a network service by an electronic device according to an embodiment of the present disclosure.

Referring to FIG. 5, the network service providing method includes operations performed in the electronic device 100 and the external electronic device 200 illustrated in FIGS. 2 to 4. Therefore, it would be understood that the above descriptions of the electronic device 100 and the external electronic device 200 illustrated in FIGS. 2 to 4 may be applied to the method illustrated in FIG. 5 even though the descriptions are omitted below.

In operation 510, the external electronic device 200 may send a network connection request to the electronic device 100.

In operation 520, the electronic device 100 may select a subscriber profile to be used by the external electronic device 200 from among a plurality of subscriber profiles available for the electronic device 100. For example, the electronic device 100 may select the subscriber profile to be used by the external electronic device 200 based on the information related to the external electronic device 200. The information related to the external electronic device 200 may be at least one of device information (e.g., a serial number, a device type, or the like) of the external electronic device 200, application information (e.g., an application identifier, an application name, an application specification, an application attribute, or the like) of an application to be executed in the external electronic device 200, or information on a service (e.g., 2G, voice over LTE (VoLTE), packet data service, or the like) requested by the external electronic device 200.

In operation 530, the electronic device 100 may provide, to the external electronic device 200, a network service according to the selected subscriber profile.

In operation 540, the electronic device 100 may transmit, to the external electronic device 200, a response to the network connection request received from the external electronic device 200. The external electronic device 200 may output a network connection result or network service information provided by the electronic device 100 through an output interface such as a display, a speaker, or the like of the external electronic device 200. Alternatively, the electronic device 100 may provide the network connection result or the network service information provided by the electronic device 100 through a user account (e.g., an account of an e-mail or SMS) of the user of the external electronic device 200.

According to an embodiment of the present disclosure, the electronic device 100 may update the subscriber profile use history based on the network service provided to the external electronic device 200.

Figure 6:
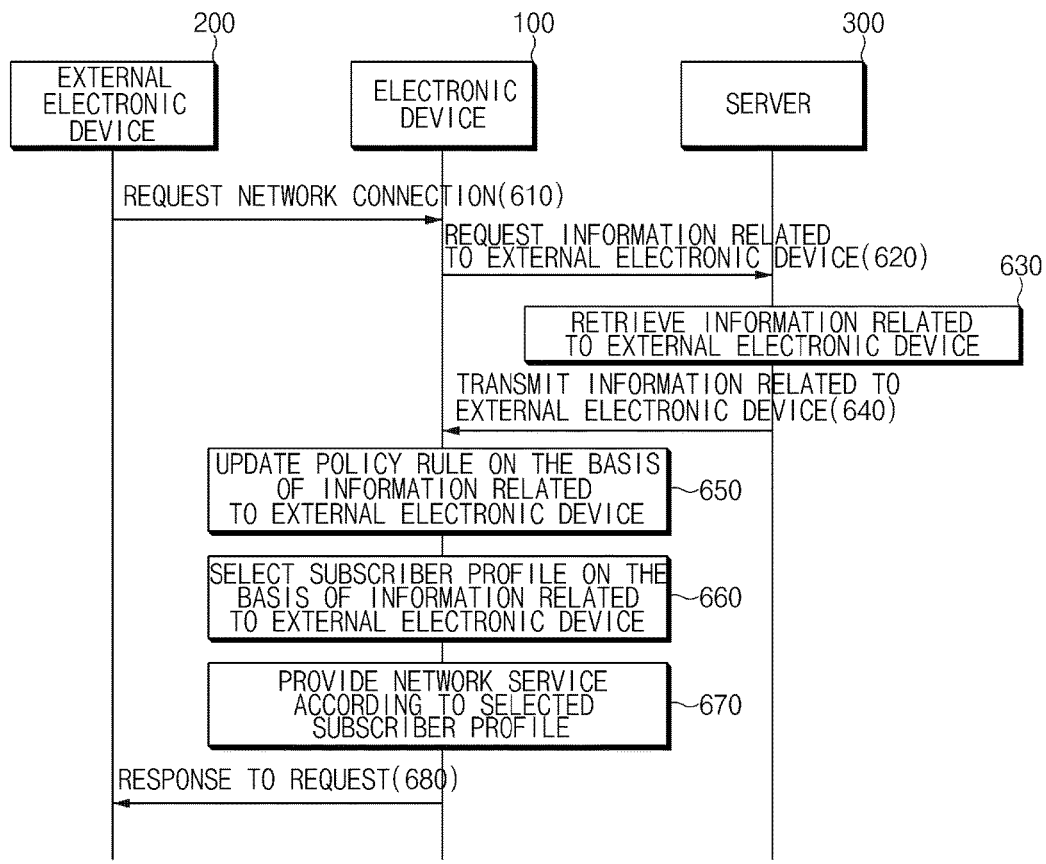
FIG. 6 is a flow diagram of a method of providing a network service by an electronic device according to an embodiment of the present disclosure.

FIG. 6 is a flow diagram of a method of providing a network service by an electronic device according to an embodiment of the present disclosure.

Referring to FIG. 6, the network service providing method includes operations performed in the electronic device 100, the external electronic device 200, and the server 300 illustrated in FIG. 2. Therefore, it would be understood that the above descriptions of the electronic device 100, the external electronic device 200, and the server 300 illustrated in FIG. 2 may be applied to the method illustrated in FIG. 6 even though the descriptions are omitted below.

According to the network service providing method according to the present embodiment, in the case where a subscriber profile is unable to be selected using only information that the electronic device 100 has, the electronic device 100 may request information related to the external electronic device 200 from the server 300 by transmitting device information or application information of the external electronic device 200 to the server 300.

In operation 610, the external electronic device 200 may send a network connection request to the electronic device 100.

In operation 620, the electronic device 100 may request the information related to the external electronic device 200 from the server 300. While requesting the information from the external electronic device 200, the electronic device 100 may transmit, to the server 300, the device information or the application information of the external electronic device 100 together with the request. The device information may be information transmitted from the external electronic device 200 to the electronic device 100 while the external electronic device 200 sends the network connection request to the electronic device 100.

Alternatively, the device information may be information transmitted from the external electronic device 200 to the electronic device 100 when the external electronic device 200 is connected to the electronic device 100. For example, in the case where the external electronic device 200 is connected to the electronic device 100 through Bluetooth, the device information may be information exchanged between the external electronic device 200 and the electronic device 100 during a process of searching for and registering a device connectable through Bluetooth when the external electronic device 200 is connected to the electronic device 100. The application information may be information received by the electronic device 100 from the electronic device 100 while the external electronic device 200 sends the network connection request to the electronic device 100.

In operation 630, the server 300 may retrieve the information related to the external electronic device 200. The server 300 may retrieve the information related to the external electronic device 200 based on the device information or the application information of the external electronic device 200 received from the electronic device 100. The information related to the external electronic device 200 may be at least one of required network service information (e.g., 2G, VoLTE, or packet data service), certain information related to a device (e.g., a device type, a data transfer amount used by a device, or the like), or certain information related to an application (e.g., a data transfer amount used by an application, an average data transfer speed, or the like).

For example, in the case where the server 300 receives a serial number of the external electronic device 200 from the electronic device 100, the server 300 may search a database of the server 300 on the basis of the serial number to receive certain device information on the external electronic device 200. Furthermore, in the case where the server 300 receives, from the electronic device 100, a name of an application to be executed by the external electronic device 200, the server 300 may receive certain information related to the application based on the name of the application.

In operation 640, the server 300 may transmit the information related to the external electronic device 200 to the electronic device 100.

In operation 650, the electronic device 100 may update the policy rule stored in the memory 130 of the electronic device 100 based on the information related to the external electronic device 200 received from the server 300.

In operation 660, the electronic device 100 may select a subscriber profile to be used by the external electronic device 200 based on the information related to the external electronic device 200.

In operation 670, the electronic device 100 may provide, to the external electronic device 200, a network service according to the selected subscriber profile.

In operation 680, the electronic device 100 may transmit, to the external electronic device 200, a response to the network connection request received from the external electronic device 200.

According to an embodiment of the present disclosure, the electronic device 100 may update the subscriber profile use history based on the network service provided to the external electronic device 200.

Figure 7:
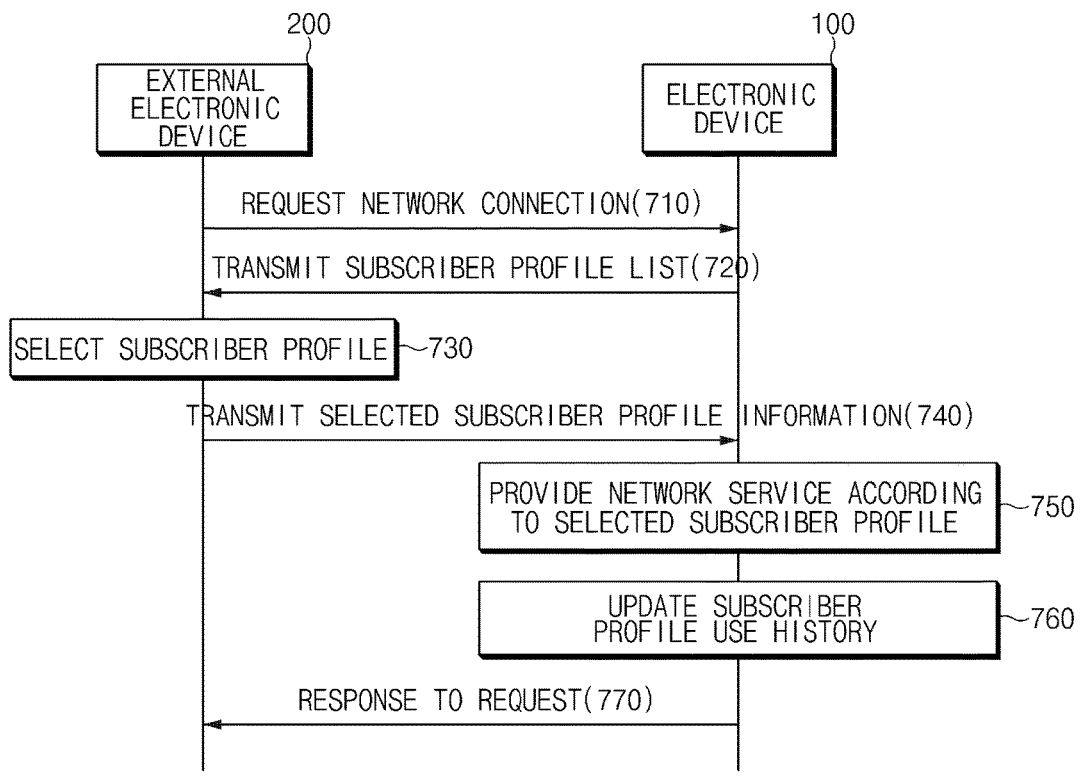
FIG. 7 is a flow diagram of a method of providing a network service by an electronic device according to an embodiment of the present disclosure.

FIG. 7 is a flow diagram of a method of providing a network service by an electronic device according to an embodiment of the present disclosure.

Referring to FIG. 7, the network service providing method includes operations performed in the electronic device 100 and the external electronic device 200 illustrated in FIGS. 1 to 4. Therefore, it would be understood that the above descriptions of the electronic device 100 and the external electronic device 200 illustrated in FIGS. 1 to 4 may be applied to the method illustrated in FIG. 7 even though the descriptions are omitted below.

In operation 710, the external electronic device 200 may send a network connection request to the electronic device 100.

In operation 720, the electronic device 100 may transmit an available subscriber profile list to the external electronic device 200. For example, the subscriber profile list may include at least one subscriber profile that can be provided to the external electronic device 200 by the electronic device 100 and a network service attribute according to each subscriber profile.

According to an embodiment of the present disclosure, the electronic device 100 may transmit the available network service list to the external electronic device 200. For example, the network service list may include a network service that can be provided by the electronic device 100 using at least one available subscriber profile. For example, the network service may include a packet data service, VoLTE, a video call, a voice call, MNO information, or the like.

In operation 730, the external electronic device 200 may select a subscriber profile from the received subscriber profile list. For example, the external electronic device 200 may notify a user of the received subscriber profile list, and may receive a user input for selecting a subscriber profile from the subscriber profile list. For example, the external electronic device 200 may notify the user of the received subscriber profile list by displaying the received subscriber profile list on a display device or outputting the received subscriber profile list as a sound through a speaker.

Alternatively, a processor of the external electronic device 200 may select a desired subscriber profile based on the received subscriber profile list and information stored in a memory of the external electronic device 200. For example, the external electronic device 200 may select a subscriber profile based on a device attribute of the external electronic device 200 or an attribute of an application to be executed. The external electronic device 200 may include an algorithm or a program for selecting a subscriber profile required by the external electronic device 200.

As described above, in the case where the electronic device 100 transmits the network service list, the external electronic device 200 may select at least one network service.

In operation 740, the external electronic device 200 may transmit selected subscriber profile information to the electronic device 100. As described above, in the case where the electronic device 100 transmits the network service list, the external electronic device 200 may transmit selected network service information to the electronic device 100.

In operation 750, the electronic device 100 may provide, to the external electronic device 200, a network service according to the selected subscriber profile. As described above, in the case where the electronic device 100 transmits the network service list, the electronic device 100 may select a subscriber profile having the selected network service, and may provide a network service according to the subscriber profile to the external electronic device 200.

In operation 760, the electronic device 100 may update the subscriber profile use history based on the network service provided to the external electronic device 200.

In operation 770, the electronic device 100 may transmit, to the external electronic device 200, a response to the network connection request received from the external electronic device 200.

Figure 8:
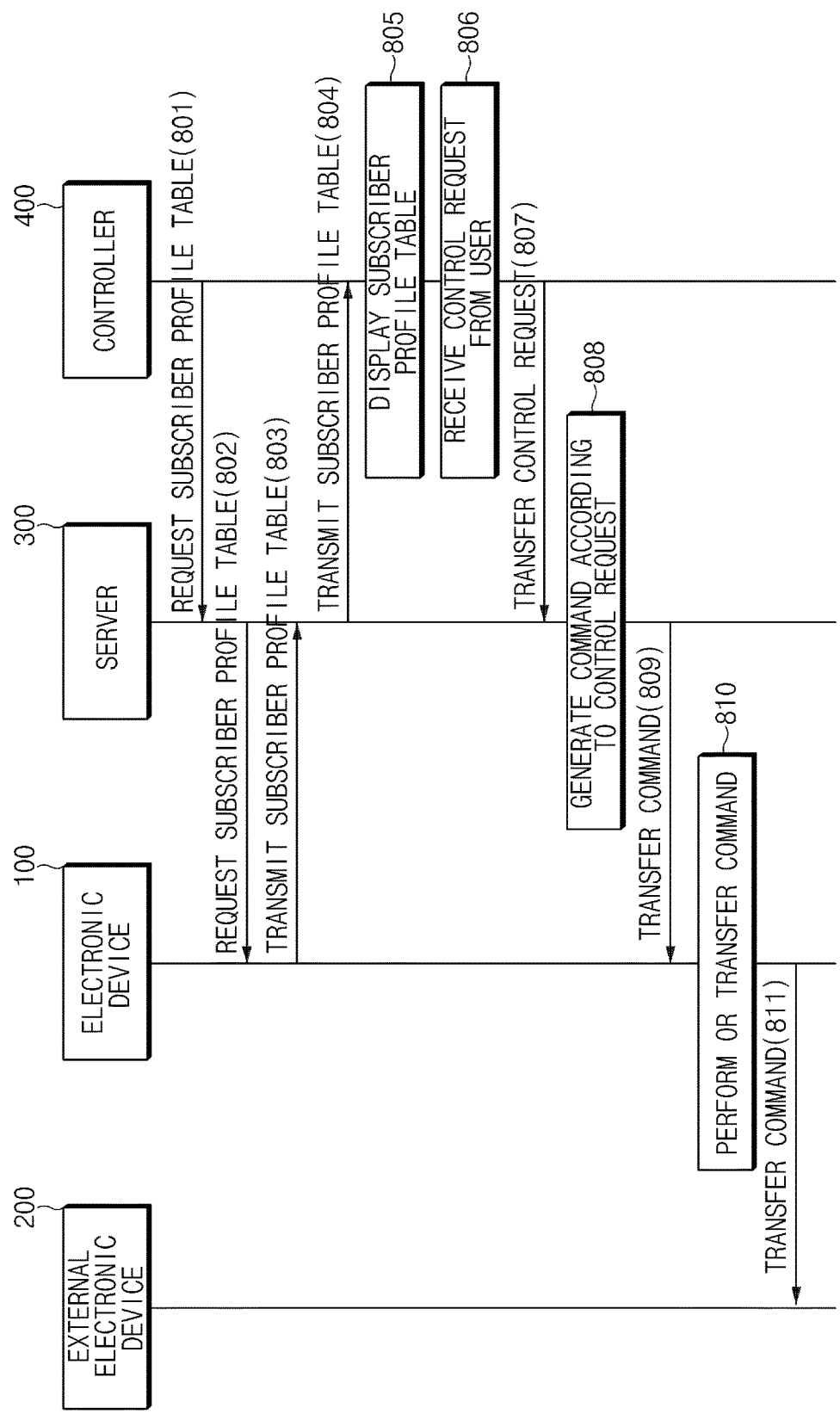
FIG. 8 is a flow diagram of a method of providing a network service by an electronic device according to an embodiment of the present disclosure.

FIG. 8 is a flow diagram of a method of providing a network service by an electronic device according to an embodiment of the present disclosure.

Referring to FIG. 8, the network service providing method includes operations performed in the electronic device 100, the external electronic device 200, and the server 300 illustrated in FIG. 2. Therefore, it would be understood that the above descriptions of the electronic device 100, the external electronic device 200, and the server 300 illustrated in FIG. 2 may be applied to the method illustrated in FIG. 8 even though the descriptions are omitted below.

In operation 801, a controller 400 may request the subscriber profile table from the server 300. For example, the controller 400 may be an application server, a web server, or a control device for providing a user with control on selection of a subscriber profile between the electronic device 100 and the external electronic device 200 connected thereto. For example, the user may access a web browser or an application provided by the controller 400, and may select a subscriber profile included in the electronic device 100 to be used by the external electronic device 200, or may change a subscriber profile used by the external electronic device 200.

According to an embodiment of the present disclosure, the controller 400 may control a plurality of electronic devices 100 (e.g., host devices) so that the electronic devices select a subscriber profile suitable for each external electronic device 200 (e.g., a client device) connected to each host device and provide a network service according to the selected subscriber profile.

In operation 802, the server 300 may request the subscriber profile table from the electronic device 100. The subscriber profile table may include at least one subscriber profile available for the electronic device 100 (each host device) and a network service attribute of each subscriber profile.

In operation 803, in response to the request from the server 300, the electronic device 100 may transmit the subscriber profile table to the server 300. The electronic device 100 may transmit, to the server 300, the subscriber profile table established at the moment of receiving the request for the subscriber profile table. If the server 300 has the subscriber profile table, the server 300 may receive the subscriber profile table from the electronic device 100 and may update the subscriber profile table of the server 300.

In operation 804, in response to the request from the controller 400, the server 300 may transmit the subscriber profile table to the controller 400.

In operation 805, the controller 400 may display the subscriber profile table received from the server 300. For example, the controller 400 may display the subscriber profile table through a web browser or an application.

Figure 12:
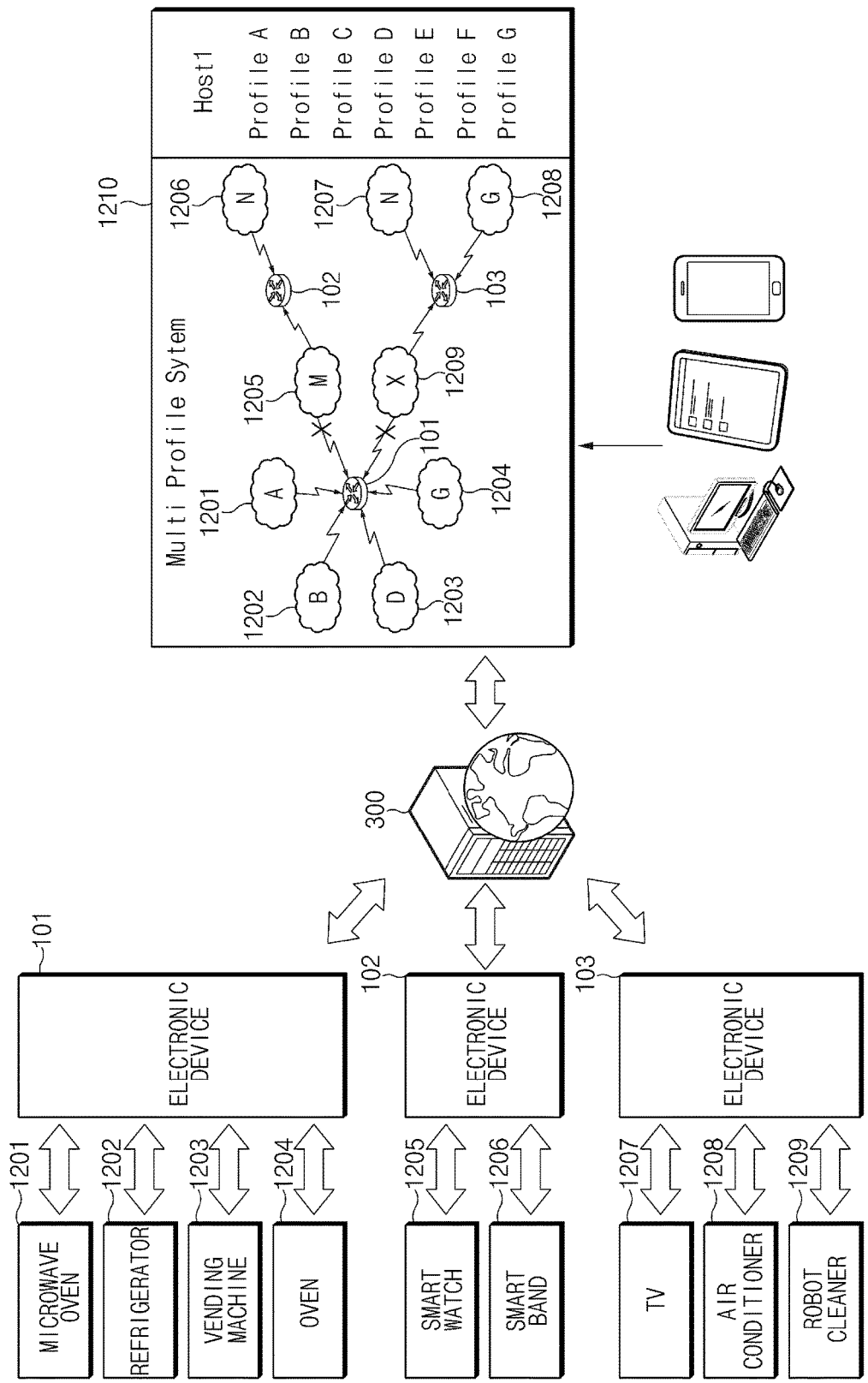
FIG. 12 is a block diagram of a user interface provided by a controller according to an embodiment of the present disclosure.

According to an embodiment of the present disclosure, the controller 400 may display, on a graphical user interface (GUI), a connection relation between a plurality of host devices and client devices connected thereto respectively and a subscriber profile used by each client device. FIG. 12 described below provides an example of this operation.

In operation 806, the controller 400 may display the subscriber profile table, and may receive, from a user, a control input (hereinafter referred to as a control request) related to the selection or change of a subscriber profile of each client device in response to the display of the subscriber profile table. For example, the user may make a control request related to the selection or change of a subscriber profile through a web browser or an application provided by the controller 400. The control request may be made to request the electronic device 100 or the external electronic device 200 to perform a certain action. For example, the action may be to update the subscriber profile table, update the policy rule, change a subscriber profile of a certain client device (e.g., the external electronic device 200), or the like.

In operation 807, the controller 400 may transfer the control request of the user to the server 300. For example, the control request may include information on a client device or a host device related to a change of a subscriber profile.

In operation 808, the server 300 may generate a command according to the control request of the controller 400. The controller 400 may generate the command based on a client device or a host device for which the user has requested control. For example, since each host device may access one server 300, the server 300 may determine to what host device and client device the requested control should be performed, and may generate the command based on the determination.

In operation 809, the server 300 may transfer the command to the electronic device 100 (e.g. corresponding host device).

In operation 810, the electronic device 100 may perform an action according to the command received from the server 300 or may transfer the command to the external electronic device 200. The electronic device 100 may determine whether the received command should be performed in the electronic device 100 or should be transferred to the external electronic device 200.

In operation 811, the electronic device 100 may transfer the command to the external electronic device 200 (e.g. corresponding client device). The external electronic device 200 may perform an action according to the command.

A method of providing a network service by an electronic device according to an embodiment of the present disclosure may include receiving a network connection request from an external electronic device functionally connected to the electronic device, selecting a subscriber profile to be used by the external electronic device from among a plurality of subscriber profiles available in the electronic device in response to the network connection request of the electronic device, and providing, by the electronic device, a network service according to the selected subscriber profile to the external electronic device.

Figure 9:
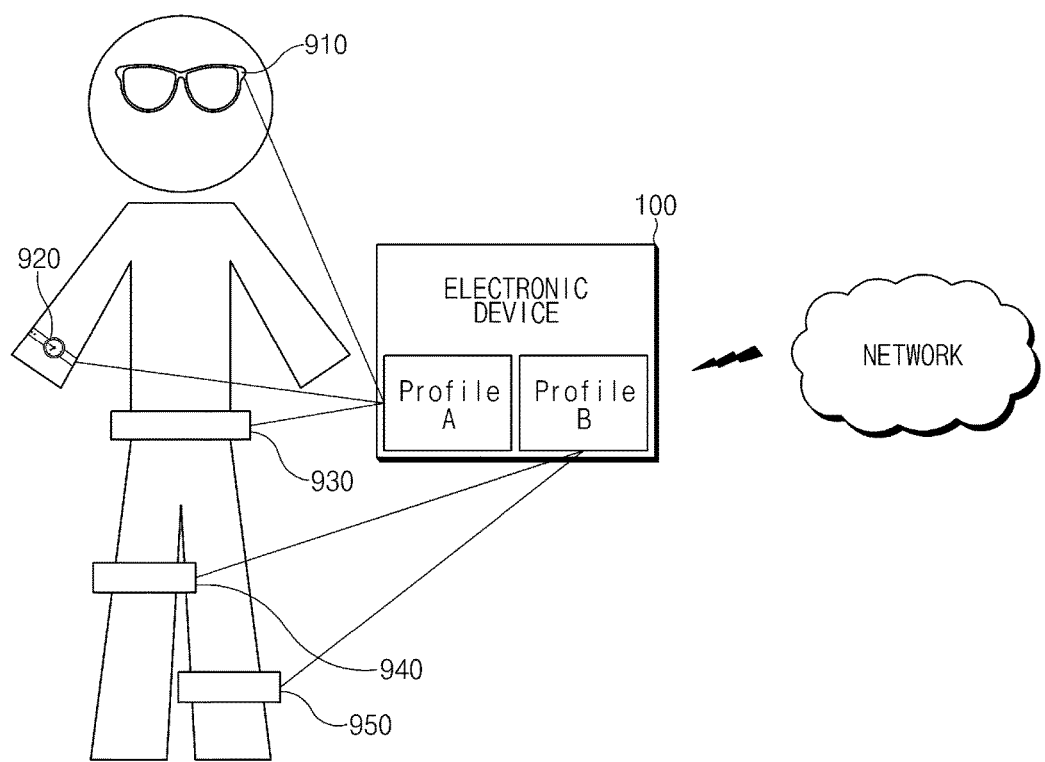
FIG. 9 is a diagram that illustrates a multi-profile system to which a network service providing method according to an embodiment of the present disclosure is applied.

FIG. 9 is a diagram that illustrates a multi-profile system to which a network service providing method according to an embodiment of the present disclosure is applied.

Referring to FIG. 9, the multi-profile system represents a system in which an electronic device including a plurality of subscriber profiles provides a network service to a plurality of external electronic devices connected to the electronic device using the subscriber profiles. According to an embodiment of the present disclosure, such a multi-profile system may be remotely controlled by a user through a controller and an application or a web browser provided by the controller.

The controller may control use of subscriber profiles of the electronic device 100 (hereafter referred to as a host device) and the external electronic device 200 (hereinafter referred to as a client device) (e.g., wearable devices 910 to 950). For example, the application or the web browser may display the host device, a client device connected thereto, and subscriber profile information used by each client through a GUI. The user may control a connection between the host device and the client device or a subscriber profile used by each client device by performing drag-and-drop or the like on the GUI provided by the application or the web browser. FIG. 12 described below provides an example of this operation.

According to an embodiment of the present disclosure, the host device or each client device may control a subscriber profile used by the client device.

As illustrated in FIG. 9, as an example of the multi-profile system, a plurality of client devices (e.g. the wearable devices 910 to 950) may be connected to a host device (e.g. the electronic device 100) such as a smartphone or a tablet personal computer (PC).

The host device may select a subscriber profile to be used by each client device based on device information, application information, requested service information, or the like of each client device 200. The host device 100 may store a subscriber profile use history of each client, and may select a subscriber profile to be used by each client device 200 using the subscriber profile use history. Alternatively, the host device 100 may select a subscriber profile to be used by each client device 200 according to a policy rule for determining the priority between network service attributes.

The wearable devices 910 to 950 are spatially limited since such devices should have a compact size and light weight. Therefore, if the wearable devices 910 to 950 are enabled to provide various network services using the plurality of subscriber profiles included in the electronic device 100 without being equipped with a cellular modem, a SIM, an antenna (for cellular communication), or the like, the convenience of a user may be improved.

Figure 10:
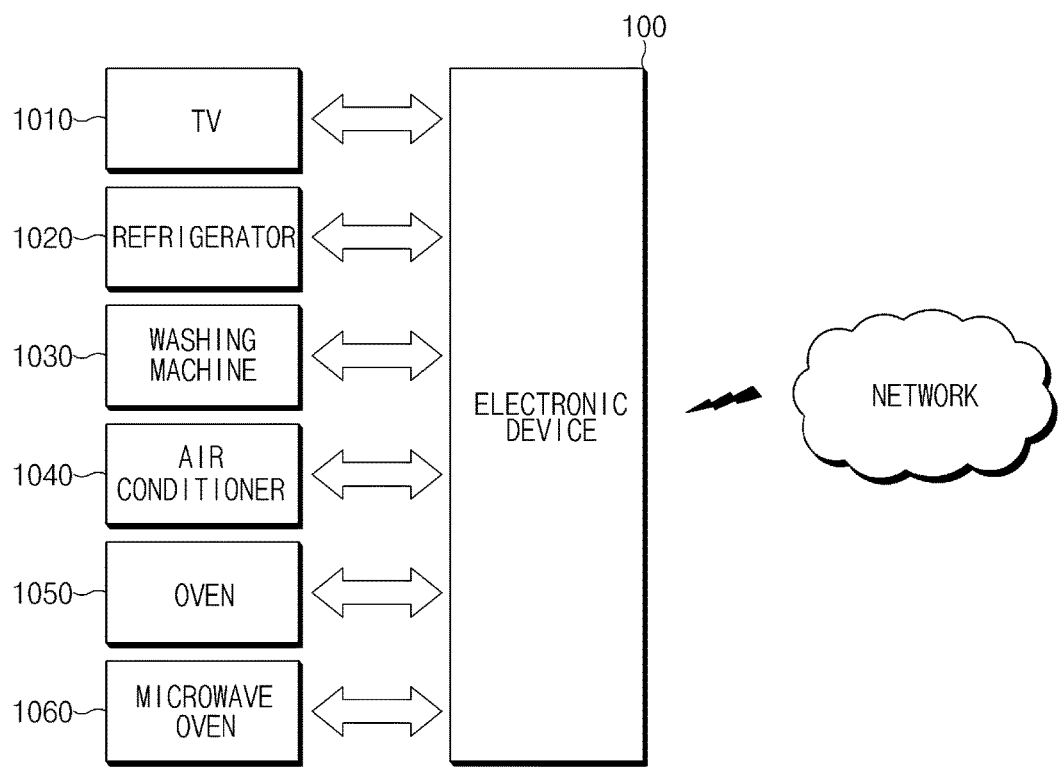
FIG. 10 is a block diagram of a multi-profile system to which a network service providing method according to an embodiment of the present disclosure is applied.

FIG. 10 is a block diagram of a multi-profile system to which a network service providing method according to an embodiment of the present disclosure is applied.

Referring to FIG. 10, a home control system as an example of the multi-profile system is illustrated. FIG. 10 illustrates that a plurality of home appliances (hereinafter referred to as client devices (e.g., a TV 1010, a refrigerator 1020, a washing machine 1030, an air conditioner 1040, an oven 1050, or a microwave oven 1060)) are connected to a home control device (e.g., a set-top box) (hereinafter referred to as a host device (e.g., the electronic device 100)) for controlling various home appliance in a home.

Since the amount of network usage of the refrigerator 1020, the washing machine 1030, the air conditioner 1040, the oven 1050, or the microwave oven 1060 is not large, it is inefficient to additionally provide a cellular module, a SIM, or an antenna to the foregoing home appliances. Therefore, the convenience of a user may be improved by providing various network services to the home appliances using the plurality of subscriber profiles included in the electronic device 100 without installing a cellular module, a SIM, an antenna, or the like in the home appliances.

In addition to the home appliances such as the refrigerator 1020, the TV 1010, and the washing machine 1030 illustrated in FIG. 10, various home appliances such as a lamp and a telephone may be included in the multi-profile system.

Figure 11:
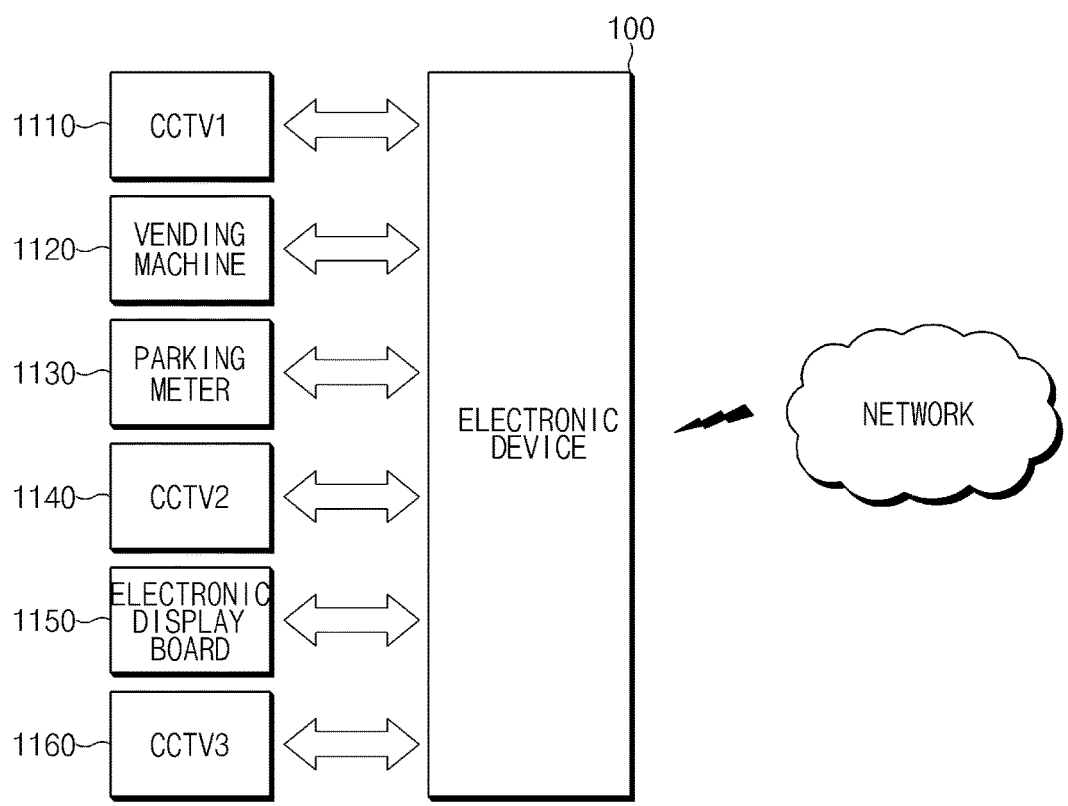
FIG. 11 is a block diagram of a multi-profile system to which a network service providing method according to an embodiment of the present disclosure is applied.

FIG. 11 is a block diagram of a multi-profile system to which a network service providing method according to an embodiment of the present disclosure is applied.

Referring to FIG. 11, an external device control system as an example of the multi-profile system is illustrated. FIG. 11 illustrates that a plurality of external devices (hereinafter referred to as client devices (e.g., a CCTV1 1110, a vending machine 1120, a parking meter 1130, a CCTV2 1140, an electronic display board 1150, or a CCTV3 1160)) are connected to a central control device (hereinafter referred to as a host device (e.g., the electronic device 100)) for controlling external devices requiring various networks.

As described above with reference to FIG. 10, since the amount of network usage of the vending machine 1120 and the parking meter 1130 is not large, it is inefficient to additionally provide a cellular module, a SIM, or an antenna to the foregoing external devices.

Furthermore, in the case where the CCTV1 1110, the CCTV2 1140, the CCTV3 1160, or the electronic display board 1150 is required to be used in a network-limited area, it requires a high cost to install a new network.

If the multi-profile system is used, various network services may be provided to the external devices using the plurality of subscriber profiles included in the electronic device 100 without installing a cellular module, a SIM, an antenna, or the like in the external devices. Even an external device located in a network-limited area may use various network services based on subscriber profiles of a central control device spaced apart a small distance from the external device by being connected to the central control device that is located in an area with a stable network through BLE, Wi-Fi, Bluetooth, or the like.

According to an embodiment of the present disclosure, the electronic device 100 may select subscriber profiles so that external electronic devices of the same type may use the same subscriber profile according to a policy rule. For example, since the CCTV1 1110, the CCTV2 1140, and the CCTV3 1160 are devices of the same type, the electronic device 100 may select or change subscriber profiles so that the same subscriber profile is used for the CCTV1 1110, the CCTV2 1140, and the CCTV3 1160.

Alternatively, the electronic device 100 may select or change subscriber profiles so that individual subscriber profiles are used for the CCTV1 1110, the CCTV2 1140, and the CCTV3 1160 that are devices of the same type.

FIG. 12 is a block diagram of a user interface provided by a controller according to an embodiment of the present disclosure.

Referring to FIG. 12, a multi-profile system in which electronic devices 101 to 103 including a plurality of subscriber profiles provide network services to a plurality of external electronic devices (e.g., a microwave oven 1201 to a robot cleaner 1209) connected to the electronic devices 101 to 103, respectively, using the subscriber profiles. Such a multi-profile system may be remotely controlled by a user through the controller.

The controller may provide a user interface 1210 as illustrated in FIG. 12 through a web browser or an application. The controller may control the electronic devices 101 to 103 so that the electronic devices 101 to 103 (hereinafter each referred to as a host device) provide network services to external electronic devices (hereinafter each referred to as a client device) connected to the electronic devices 101 to 103, respectively, using a subscriber profile. The controller may also control a connection relation between the host devices 101 to 103 and the client devices 1201 to 1209 connected thereto.

The controller may control, via the server 300, the host devices 101 to 103 and the client devices 1201 to 1209 connected thereto. For example, if the controller receives a control request of a user through the user interface 1210, the controller may transmit the control request to each host device 101 to 103 via the server 300.

The user interface 1210 may display the host devices 101 to 103 controlled by the controller, the client devices 1201 to 1209 connected thereto, and subscriber profile information used by each client device 1201 to 1209. For example, the user may perform drag-and-drop on the user interface 1210 so as to connect or disconnect a host device 101 to 103 to or from a client device 1201 to 1209 or select or change a subscriber profile provided by a host device 101 to 103 and used by a client device 1201 to 1209.

Referring to FIG. 12, there are three host devices 101 to 103, and a plurality of client devices (e.g., the microwave oven 1201 to the robot cleaner 1209) are connected to each host device 101 to 103. The user may check, through the user interface 1210, a plurality of subscriber profiles A to G available for the electronic device 101 (e.g. host 1). Furthermore, the user may check a subscriber profile currently used by each client device 1201 to 1209. For example, information indicating that the microwave oven 1201 uses a profile A and a refrigerator 1202 uses a profile B may be displayed on the user interface 1210.

Through the user interface 1210, the user may disconnect a smart watch 1205 from the electronic device 101 and may connect the smart watch 1205 to the electronic device 102 so that the smart watch 1205 may use a subscriber profile M provided by the electronic device 102.

Furthermore, through the user interface 1210, the user may disconnect the robot cleaner 1209 from the electronic device 101 and may connect the robot cleaner 1209 to the electronic device 103 so that the robot cleaner 1209 may use a subscriber profile X provided by the electronic device 103.

According to an embodiment of the present disclosure, the user interface 1210 may display a network service usage fee charged for each client device.

Figure 13:
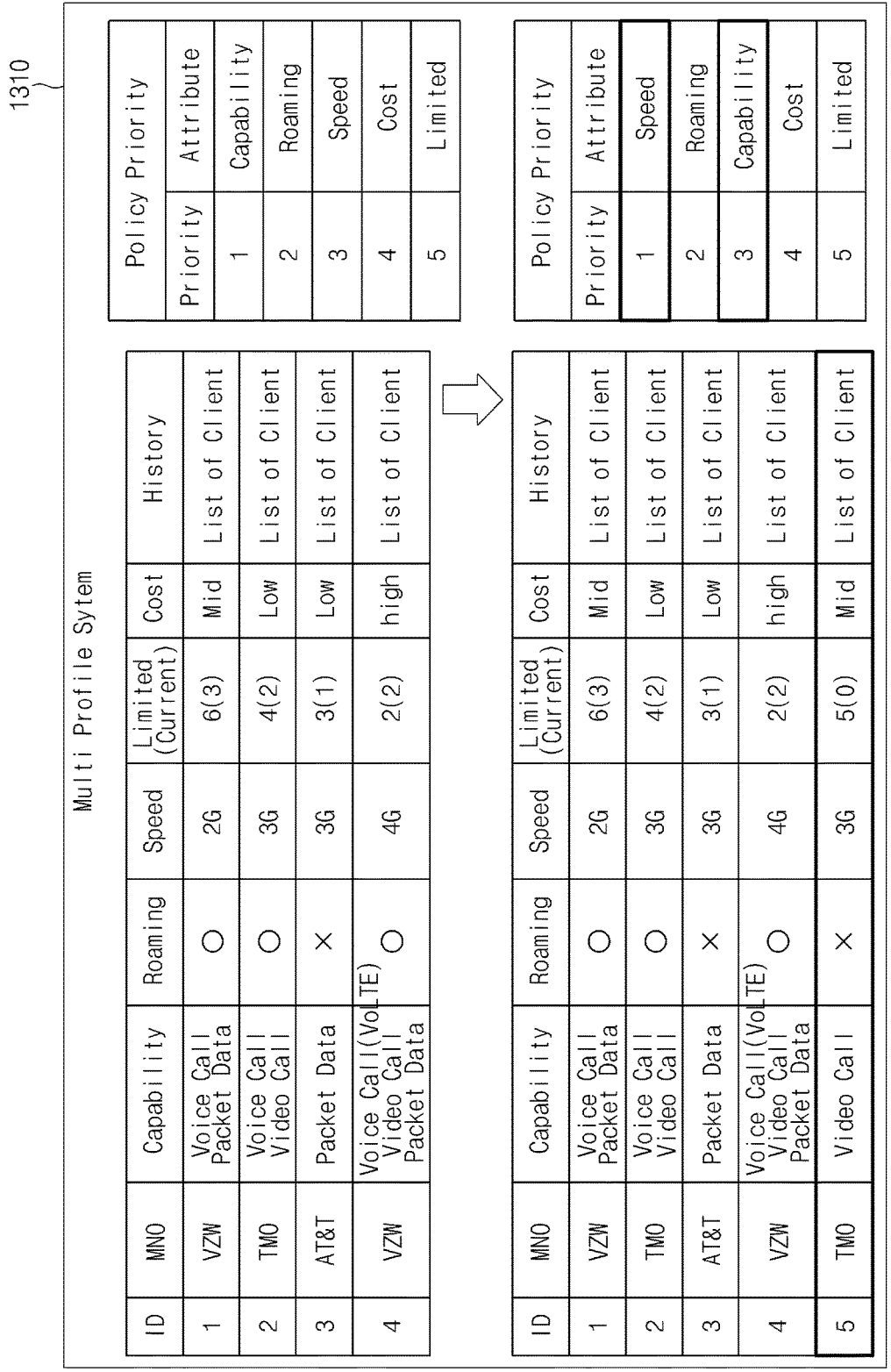
FIG. 13 is a diagram of a user interface provided by a controller according to an embodiment of the present disclosure.

FIG. 13 is a diagram of a user interface provided by a controller according to an embodiment of the present disclosure.

Referring to FIG. 13, the controller may provide a user interface 1310 through a web browser or an application. The user interface 1310 may display the subscriber profile table (e.g., Table 1 above), and may allow the user to add a new subscriber profile to the subscriber profile table or delete a subscriber profile therefrom. Furthermore, the user may add, delete, or change a policy rule on the basis of the subscriber profile table.

For example, the user may change a priority between network service attributes of a policy rule through the interface 1310. As illustrated in FIG. 13, the user may change the priority order of Capability>Roaming>Speed>Cost>Limited(Current) of the policy rule into the priority order of Speed>Roaming>Capability>Cost>Limited(Current).

The user may input, through the user interface 1310, a control request for requesting that the same policy rule should be applied to a plurality of host devices managed by the controller.

The term "module" used herein may refer to, for example, a unit including one or more combinations of hardware, software and firmware. The term "module" may be interchangeably used with the terms "unit," "logic," "logical block," "component" and "circuit." The term "module" may refer to a minimum unit of an integrated component or may refer to a part thereof. The term "module" may refer to a minimum unit for performing one or more functions or a part thereof.

According to an embodiment of the present disclosure, at least a part of devices (e.g., modules or functions thereof) or methods (e.g., operations) may be implemented as instructions stored in a non-transitory computer-readable storage medium in the form of a programming module. In the case where the instructions are performed by at least one processor, the at least one processor may perform functions corresponding to the instructions.

The non-transitory computer-readable storage medium may include magnetic media such as a hard disk, a floppy disk, and a magnetic tape, optical media such as a compact disk read only memory (CD-ROM) and a digital versatile disc (DVD), magneto-optical media such as a floptical disk, and a hardware device configured to store and execute program instructions (e.g., a programming module), such as a ROM, a random access memory (RAM), and a flash memory. The program instructions may include machine language code generated by compilers and high-level language code that can be executed by computers using interpreters. The above-described hardware may be configured to be operated as one or more software modules for performing operations of an embodiment of the present disclosure and vice versa.

According to an embodiment of the present disclosure, a storage medium stores instructions configured to instruct at least one processor to perform at least one operation when being executed by the at least one processor, wherein the at least one operation may include receiving a network connection request from an external electronic device functionally connected to an electronic device, selecting a subscriber profile to be used by the external electronic device from among a plurality of subscriber profiles available in the electronic device in response to the network connection request of the electronic device, and providing, by the electronic device, a network service according to the selected subscriber profile to the external electronic device.

According to an embodiment of the present disclosure, an electronic device not having a cellular module or a SIM (hereinafter referred to as a client electronic device) may be connected to a network by connecting the client electronic device to an electronic device having a cellular module (hereinafter referred to as a host electronic device) through Wi-Fi, Bluetooth, or the like and using a subscriber profile included in the host electronic device. Accordingly, the client device may not be equipped with hardware elements such as a SIM slot, a cellular module, an antenna, or the like, so that the client device may have a compact size.

The host electronic device may automatically select a profile from among multiple profiles available in the host electronic device according to the type of the connected client electronic device, an application executed in the client electronic device, or service information requested by the client electronic device. Therefore, the convenience of a user may be improved.

The above embodiments of the present disclosure are illustrative and not limitative. Various alternatives and equivalents are possible. Other additions, subtractions, or modifications may be obvious in view of the present disclosure and are intended to fall within the scope of the present disclosure, as defined by the appended claims and their equivalents.

What is claimed is:

1. A mobile device, comprising:
an embedded universal integrated circuit card (eUICC) configured to store a plurality of subscriber profiles;
a memory configured to store a subscriber profile use history;
at least one processor configured to select a subscriber profile to be used by an external electronic device functionally connected to the mobile device from among the plurality of subscriber profiles available in the mobile device, based on the subscriber profile use history; and
a communication circuit electronically connected to the eUICC and configured to provide, to the external electronic device, a network service based on the subscriber profile selected.

2. The mobile device of claim 1, wherein the communication circuit is further configured to receive information related to the external electronic device from the external electronic device or a server, and
wherein the at least one processor is further configured to select the subscriber profile to be used by the external electronic device from among the plurality of subscriber profiles based on the received information related to the external electronic device.

3. The mobile device of claim 2, wherein the information related to the external electronic device is at least one of device information of the external electronic device, application information of an application to be executed in the external electronic device, and information on a service requested by the external electronic device.

4. The mobile device of claim 2, further comprising:
a memory configured to store a subscriber profile table in which a network service attribute provided by each of the plurality of subscriber profiles is defined,
wherein the at least one processor is further configured to select the subscriber profile to be used by the external electronic device from among the plurality of subscriber profiles using the subscriber profile table.

5. The mobile device of claim 1, further comprising:
a memory configured to store a policy rule for determining a priority between network service attributes,
wherein the at least one processor is further configured to select the subscriber profile to be used by the external electronic device according to the policy rule.

6. The mobile device of claim 5, wherein the memory is further configured to store a plurality of policy rules according to an external electronic device type or an application type, and update the plurality of policy rules based on information received from a server or a user input to the mobile device.

7. The mobile device of claim 5, wherein the at least one processor is further configured to select one subscriber profile for external electronic devices of a same type.

8. The mobile device of claim 1, wherein the memory is further configured to store the subscriber profile use history for each external electronic device, for each application, or for each service information requested by the external electronic device.

9. The mobile device of claim 1, wherein, if a data transfer speed of the network service based on the subscriber profile decreases to less than or equal to a pre-determined value, the at least one processor is further configured to change the subscriber profile of at least one external electronic device that uses the subscriber profile.

10. The mobile device of claim 1, wherein, if the network service based on the subscriber profile is not available, the at least one processor is further configured to change the subscriber profile of the external electronic device that uses the subscriber profile.

11. The mobile device of claim 1, wherein, if a number of external electronic devices that have selected the subscriber profile exceeds a number of mobile devices allowed to use the subscriber profile, the at least one processor is further configured to change the subscriber profile of at least one external electronic device that uses the subscriber profile.

12. The mobile device of claim 1, wherein the at least one processor is further configured to replace the subscriber profile used by the external electronic device with another subscriber profile based on a user input to the mobile device.

13. The mobile device of claim 1, wherein the plurality of subscriber profiles include a subscriber profile of a subscriber identity module (SIM) inserted into a card slot of the mobile device, or a subscriber profile included in the external electronic device.

14. The mobile device of claim 1, wherein the communication circuit is further configured to transmit an available subscriber profile list to the external electronic device and receive subscriber profile information from the external electronic device, and
wherein the at least one processor is further configured to select the subscriber profile to be used by the external electronic device based on the subscriber profile information.

15. The mobile device of claim 1, wherein the communication circuit is further configured to receive a network connection request from the external electronic device, and
wherein the at least one processor is further configured to select the subscriber profile to be used by the external electronic device in response to the network connection request.

16. The mobile device of claim 15, wherein the communication circuit is further configured to notify the external electronic device of a network connection result with respect to the network connection request.

17. The mobile device of claim 1, wherein the communication circuit is further configured to receive a command from a controller that is configured to remotely control use of the subscriber profile of the external electronic device, and
wherein the at least one processor is further configured to select the subscriber profile to be used by the external electronic device or change the subscriber profile being used by the external electronic device based on the command.

18. The mobile device of claim 17, wherein the at least one processor is further configured to add or amend a policy rule for determining a priority between network service attributes based on the command received from the controller.

19. The mobile device of claim 1, wherein the communication circuit is further configured to provide a network service to a plurality of external electronic devices functionally connected to the mobile device using at least one of the plurality of subscriber profiles, and
wherein the at least one processor is further configured to calculate a network service usage fee for each external electronic device.

20. A method of providing a network service, the method comprising:
receiving a network connection request from an external electronic device functionally connected to a mobile device;
selecting, in response to the network connection request received by the mobile device, a subscriber profile to be used by the external electronic device from among a plurality of subscriber profiles stored in an embedded universal integrated circuit card (eUICC) in the mobile device, based on a subscriber profile use history stored in a memory of the mobile device; and
providing, by the mobile device, a network service based on the selected subscriber profile to be used by the external electronic device.

* * * * *